(12) United States Patent
Wu et al.

(10) Patent No.: US 10,644,600 B2
(45) Date of Patent: May 5, 2020

(54) CONSTANT-TIME BUCK-BOOST SWITCHING REGULATOR AND CONTROL CIRCUIT AND CONTROL METHOD THEREOF

(71) Applicant: RICHTEK TECHNOLOGY CORPORATION, Zhubei, Hsinchu (TW)

(72) Inventors: Kuo-Chun Wu, KaoHsiung (TW); Hung-Yu Cheng, Taipei (TW)

(73) Assignee: RICHTEK TECHNOLOGY CORPORATION, Zhubei, Hsinchu (TW)

(*) Notice: Subject to any disclaimer, the term of this patent is extended or adjusted under 35 U.S.C. 154(b) by 0 days.

(21) Appl. No.: 16/171,422

(22) Filed: Oct. 26, 2018

(65) Prior Publication Data

US 2019/0296642 A1     Sep. 26, 2019

Related U.S. Application Data

(60) Provisional application No. 62/647,808, filed on Mar. 25, 2018.

(30) Foreign Application Priority Data

Aug. 31, 2018   (CN) .......................... 2018 1 1011080

(51) Int. Cl.
  *H02M 3/158*   (2006.01)
  *H02M 3/156*   (2006.01)
  *H02M 1/00*    (2006.01)

(52) U.S. Cl.
  CPC ....... *H02M 3/1582* (2013.01); *H02M 3/1563* (2013.01); *H02M 2001/0054* (2013.01); *H02M 2003/1566* (2013.01)

(58) Field of Classification Search
  CPC ....... H02M 3/1582; H02M 2003/1566; H02M 3/1563
  See application file for complete search history.

(56) References Cited

U.S. PATENT DOCUMENTS

| 6,166,527 | A | 12/2000 | Dwelley et al. |
| 7,176,667 | B2 | 2/2007 | Chen et al. |
| 9,787,187 | B2 | 10/2017 | Cheng |
| 2011/0156685 | A1 | 6/2011 | Chen et al. |
| 2011/0227550 | A1* | 9/2011 | Walters ............... H02M 3/1582 323/283 |
| 2012/0153915 | A1* | 6/2012 | Loikkanen .............. G05F 1/618 323/283 |

(Continued)

*Primary Examiner* — Fred E Finch, III
(74) *Attorney, Agent, or Firm* — Tung & Associates

(57) ABSTRACT

When a ramp signal intersects a feedback related signal, a constant time switching regulator enters a first state and maintains in the first state for a constant time, and after the constant time ends, when the ramp signal exceeds the feedback related signal, the switching regulator enters a second state, while when the ramp signal does not exceed the feedback related signal, the switching regulator enters a third state. In the first state, the first end of an inductor is connected to input voltage and the second end of the inductor is connected to output voltage; in the second state, the first end is connected to ground and the second end is connected to output voltage; and in the third state, the first end is connected to input voltage and the second end is connected to ground.

22 Claims, 15 Drawing Sheets

(56) References Cited

U.S. PATENT DOCUMENTS

| | | | | |
|---|---|---|---|---|
| 2015/0303807 A1* | 10/2015 | Garvey | ............... | H02M 1/08 |
| | | | | 323/271 |
| 2016/0094125 A1* | 3/2016 | Milanesi | ........... | H02M 3/1584 |
| | | | | 323/271 |
| 2016/0190931 A1* | 6/2016 | Zhang | ............... | H02M 3/1582 |
| | | | | 323/271 |
| 2016/0352228 A1* | 12/2016 | Zhang | ................. | H02M 1/32 |
| 2016/0365790 A1* | 12/2016 | Ye | ..................... | H02M 3/1582 |
| 2017/0346400 A1* | 11/2017 | Li | ..................... | H02M 3/1582 |
| 2018/0358900 A1* | 12/2018 | Sun | ................... | H02M 3/1582 |
| 2019/0131876 A1* | 5/2019 | Luff | .................. | H02M 3/1582 |
| 2019/0181753 A1* | 6/2019 | Sharma | ............... | H02M 3/157 |

\* cited by examiner

AD: First State, Switches A and D ON, Switches B and C OFF
BD: Second State, Switches B and D ON, Switches A and C OFF
AC: Third State, Switches A and C ON, Switches B and D OFF
Td: Fourth State, Switch A ON and Switches B, C and D OFF; or Switch D ON and Switches A, B and C OFF

CONSTANT-TIME BUCK-BOOST SWITCHING REGULATOR AND CONTROL CIRCUIT AND CONTROL METHOD THEREOF

CROSS REFERENCE

The present invention claims priority to U.S. 62/647,808, filed on Mar. 25, 2018, and CN 201811011080.5, filed on Aug. 31, 2018.

BACKGROUND OF THE INVENTION

Field of Invention

The present invention relates to a constant-time buck-boost switching regulator, particularly to a buck-boost switching regulator circuit wherein the buck mode power conversion and/or the boost mode power conversion are performed by constant time. The present invention also relates to a control circuit and a control method for use in the constant-time buck-boost switching regulator circuit.

Description of Related Art

FIG. 1A shows a prior art method for controlling a buck-boost switching regulator, disclosed in U.S. Pat. No. 6,166,527. The buck-boost switching regulator includes an inductor L, four power switches A, B, C and D, and a control circuit 20. The control circuit 20 controls the operations of the four power switches A, B, C and D to convert an input voltage Vin to an output voltage Vout, wherein the input voltage Vin may be higher or lower than output voltage Vout, so the regulator may need to perform buck or boost power conversion. In the control circuit 20, an error amplifier 22 compares a feedback signal FB (indicating information of the output voltage Vout) with a reference voltage Vref, to generate an error amplified signal Vea. PWM (pulse width modulation) comparators 24 and 25 compare the error amplified signal Vea with voltage waveforms VX and VY respectively, and a logic circuit 29 generate switch control signals VA, VB, VC and VD to control the power switches A, B, C and D respectively according to the outputs from the PWM comparators 24 and 25.

The relationships among the error amplified signal Vea, the voltage waveforms VX and VY, and the switch control signals VA, VB, VC and VD are shown in FIG. 1B. As shown in the figure, when the error amplified signal Vea is between V1 and V2, the buck-boost switching regulator performs pure buck power conversion; when the error amplified signal Vea is between V2 and V3, the buck-boost switching regulator performs buck-boost power conversion; when the error amplified signal Vea is between V3 and V4, the buck-boost switching regulator performs pure boost power conversion. In pure buck power conversion, the power switch A is kept ON and the power switch B is kept OFF. In buck-boost power conversion, as shown in the figure, the relative relationship between the error amplified signal Vea and the voltage waveform VX determines the switch control signals VA and VB, and the relative relationship between the error amplified signal Vea and the voltage waveform VY determines the switch control signals VC and VD; in other words, the buck-boost switching regulator performs mixed operations of boost power conversion (operating power switches C and D) and buck power conversion (operating power switches A and B).

This prior art buck-boost switching regulator has pure buck power conversion mode, pure boost power conversion mode, and buck-boost power conversion mode, and there must be a voltage section for buck-boost power conversion (i.e., between V2 and V3, and V2 has to be smaller than V3; otherwise, it will be unstable). However, during the buck-boost power conversion mode, all four switches keep operating to cause high switching loss and consume more power, which is a major drawback of this prior art.

FIG. 2A shows another prior art, disclosed in U.S. Pat. No. 7,176,667. In this prior art, an error amplifier 22 generates two error amplified signals Vea1 and Vea2, and one of them is selected to be inputted to a PWM comparator 24 to be compared with a voltage waveform OSC. The buck-boost switching regulator further includes a constant ON-time generation circuit 26, and a logic circuit 29 generates switch control signals VA, VB, VC and VD to control the power switches A, B, C and D respectively according to the outputs from the PWM comparator 24 and the constant ON-time generation circuit 26.

Referring to FIG. 2B, the buck-boost switching regulator disclosed in U.S. Pat. No. 7,176,667 has four power conversion modes. Besides the pure buck power conversion mode M1 and the pure boost power conversion mode M4, there are two intermediate modes: the intermediate buck power conversion mode M2 and the intermediate boost power conversion mode M3. In the intermediate buck power conversion mode M2, the switch control signals VA and VB follow the output of the PWM comparator 24 and the switch control signals VC and VD have constant pulse widths, while in the intermediate boost power conversion mode M3 the switch control signals VC and VD follow the output of the PWM comparator 24 and the switch control signals VA and VB have constant pulse widths.

This prior art has the following drawbacks: first, the control scheme of four power conversion modes is complicated, requiring the constant ON-time generation circuit 26 and other circuit components; second, there are two intermediate modes and this means that there is significant likelihood of operating in these modes, and in these two intermediate modes all four switches keep operating, which causes high switching loss and consumes more power.

In addition, both U.S. Pat. Nos. 6,166,527 and 7,176,667 operate by fixed frequency. Limited by the constant switch frequency and the bandwidth, a fixed frequency switching regulator has a slower load response; if these prior arts need to realize pulse frequency modulation (PFM), it requires very complicated circuitry, such as in a condition of very low load current, or PFM is impossible, for example when the input voltage Vin is very close to the output voltage Vout.

FIG. 3A shows another prior art, disclosed in US 2011/0156685 A1. In this prior art, the buck-boost switching regulator includes an inductor L, four power switches A, B, C and D, and a control circuit 30. The control circuit 20 controls the operations of the four power switches A, B, C and D to convert an input voltage Vin to an output voltage Vout. In the control circuit 30, an error amplifier 32 compares a feedback signal FB (indicating information of the output voltage Vout) with a reference voltage Vref, to generate an error amplified signal which is inputted to a PWM comparator 34. The buck-boost switching regulator also obtains information regarding the inductor current and inputs it to the PWM comparator 34 to be compared with the error amplified signal. The output of the PWM comparator 34 is sent to an ON-time generation circuit 37 to generate the ON-time of the power switches. A driver circuit 39 generate switch control signals VA, VB, VC and VD to control the power switches A, B, C and D respectively according to the generated ON-time. This prior art is characterized by requiring only one PWM comparator 34, because it is required to generate only one set of ON-time. Although this prior art can realize a buck-boost switching regulator by very simple circuitry, it has a drawback that: regardless whether the input voltage is higher than, close to, or smaller than the output voltage, this prior art needs to operate in buck-boost power conversion mode wherein all four power switches A, B, C and D need to operate; as shown in FIGS. 3B and 3C, all four power switches A, B, C and D keep turning ON and OFF cycle by cycle, causing high switching loss, wherein FIG. 3C shows the current paths (solid path corresponding to power switches A and C ON and dashed path corresponding to power switches B and D ON).

FIGS. 4A-4D show another prior art disclosed in U.S. Pat. No. 9,787,187. This prior art uses two comparators, respectively cooperating with a constant ON-time generator and a constant OFF-time generator to generate two sets of constant time, such that the buck-boost switching regulator 50 operates in a pure boost power conversion mode or a pure buck power conversion mode, wherein the conduction time of the power switches A and D can be extended unlimitedly.

The prior art in FIGS. 4A-4D has the drawback that, because the conduction time of the power switches A and D can be extended unlimitedly, the operation frequency of the buck-boost switching regulator can vary in a large range, which may cause noise interference and large ripple in the output voltage.

Compared with the aforementioned prior arts, the buck-boost switching regulator according to the present invention has advantages of fast load transient response, no requirement of slope compensation, and ability to operate in PFM without complicated control; further, the buck-boost switching regulator according to the present invention is capable of operating only in pure buck power conversion mode and pure boost power conversion mode without a buck-boost power conversion mode or intermediate mode, and the conduction time is not unlimitedly extended, so the variation of its operation frequency is small and there is less interference and smaller output ripple in the output voltage.

SUMMARY OF THE INVENTION

From one perspective, the present invention provides a constant time buck-boost switching regulator, comprising: a power switch circuit, including an input switch unit and an output switch unit; the input switch unit being configured to operably switch a first end of an inductor between an input voltage and a ground, and the output switch unit being configured to operably switch a second end of the inductor between an output voltage and the ground; and a control circuit, when a ramp signal intersects a feedback related signal, the control circuit being configured to operably control the power switch circuit to enter a first state and maintain in the first state for a constant time, and after the constant time ends, when the ramp signal exceeds the feedback related signal, the control circuit being configured to operably control the power switch circuit to enter a second state, while when the ramp signal does not exceed the feedback related signal, the control circuit being configured to control the power switch circuit to enter a third state, wherein the feedback related signal is related to the output voltage; wherein, in the first state, the power switch circuit electrically connects the first end of the inductor to the input voltage and electrically connects the second end of the inductor to the output voltage; in the second state, the power switch circuit electrically connects the first end of the inductor to the ground and electrically connects the second end of the inductor to the output voltage; and in the third state, the power switch circuit electrically connects the first end of the inductor to the input voltage and electrically connects the second end of the inductor to the ground.

In one embodiment, the ramp signal is related to a current of the inductor (inductor current), or simulates the inductor current.

In one embodiment, the ramp signal is proportional to the inductor current.

In one embodiment, the feedback related signal corresponds to a stable state value.

In one embodiment, the ramp signal does not include a direct current component of the inductor current.

In one embodiment, the control circuit includes: a comparison circuit, configured to operably compare the ramp signal with the feedback related signal to generate a comparison output signal; a constant time generation circuit, configured to operably trigger the constant time according to the comparison output signal when the ramp signal intersects the feedback related signal; and a logic driver circuit, coupled to the comparison circuit and the constant time generation circuit, and configured to operably control the power switch circuit to enter the first state and maintain in the first state for the constant time, and control the power switch circuit to enter the second or third state when the constant time ends according to a level of the comparison output signal.

In one embodiment, the control circuit further includes an error amplifier circuit, configured to operably generate the feedback related signal according to a difference between a signal related to the output voltage and a reference voltage.

In one embodiment, the control circuit further includes a ramp generation circuit, configured to operably generate the ramp signal by one or more of the following ways: (1) the ramp generation circuit senses a current of the inductor (inductor current), and generates the ramp signal according to the inductor current; and/or (2) the ramp generation circuit simulates the inductor current according to the input voltage and the output voltage to generate the ramp signal.

In one embodiment, between the first state and the second state, or between the first state and the third state, there is a fourth state which is a dead time, wherein in the fourth state, the control circuit controls the power switch circuit such that the first end or the second end of the inductor is floating.

In one embodiment, the input switch unit includes: an input upper switch, coupled between the input voltage and the first end of the inductor; and an input lower switch or an input lower diode, coupled between the ground and the first end of the inductor; wherein the control circuit controls the input upper switch, or the input upper switch and the input lower switch, to switch the first end of the inductor between the input voltage and the ground.

In one embodiment, the output switch unit includes: an output lower switch, coupled between the ground and the second end of the inductor; and an output upper switch or an output upper diode, coupled between the output voltage and the second end of the inductor; wherein the control circuit controls the output lower switch, or the output upper switch and the output lower switch, to switch the second end of the inductor between the output voltage and the ground.

In another aspect, the present invention provides a control circuit for controlling a constant time buck-boost switching regulator, the constant time buck-boost switching regulator including a power switch circuit which includes an input switch unit and an output switch unit; the input switch unit being configured to operably switch a first end of an inductor between an input voltage and a ground, and the output switch unit being configured to operably switch a second end of the inductor between an output voltage and the ground, wherein an inductor current flows through the inductor; when a ramp signal intersects a feedback related signal, the control circuit being configured to operably control the power switch circuit to enter a first state and maintain in the first state for a constant time, and after the constant time ends, when the ramp signal exceeds the feedback related signal, the control circuit being configured to operably control the power switch circuit to enter a second state, while when the ramp signal does not exceed the feedback related signal, the control circuit being configured to control the power switch circuit to enter a third state, wherein, in the first state, the power switch circuit electrically connects the first end of the inductor to the input voltage and electrically connects the second end of the inductor to the output voltage; in the second state, the power switch circuit electrically connects the first end of the inductor to the ground and electrically connects the second end of the inductor to the output voltage; and in the third state, the power switch circuit electrically connects the first end of the inductor to the input voltage and electrically connects the second end of the inductor to the ground, and wherein the feedback related signal is related to the output voltage; the control circuit comprising: a comparison circuit, configured to operably compare the ramp signal with the feedback related signal to generate a comparison output signal; a constant time generation circuit, configured to operably trigger the constant time according to the comparison output signal when the ramp signal intersects the feedback related signal; and a logic driver circuit, coupled to the comparison circuit and the constant time generation circuit, and configured to operably control the power switch circuit to enter the first state and maintain in the first state for the constant time, and control the power switch circuit to enter the second or third state when the constant time ends according to a level of the comparison output signal.

In another aspect, the present invention provides a control method for controlling a constant time buck-boost switching regulator, the constant time buck-boost switching regulator including a power switch circuit which includes an input switch unit and an output switch unit; the input switch unit being configured to operably switch a first end of an inductor between an input voltage and a ground, and the output switch unit being configured to operably switch a second end of the inductor between an output voltage and the ground, wherein an inductor current flows through the inductor; the control method comprising: when a ramp signal intersects a feedback related signal, controlling the power switch circuit to enter a first state and maintain in the first state for a constant time, wherein the feedback related signal is related to the output voltage; when the constant time ends, judging whether the ramp signal exceeds the feedback related signal; and when the ramp signal exceeds the feedback related signal, controlling the power switch circuit to enter a second state, or when the ramp signal does not exceed the feedback related signal, controlling the power switch circuit to enter a third state; wherein, in the first state, the power switch circuit electrically connects the first end of the inductor to the input voltage and electrically connects the second end of the inductor to the output voltage; in the second state, the power switch circuit electrically connects the first end of the inductor to the ground and electrically connects the second end of the inductor to the output voltage; and in the third state, the power switch circuit electrically connects the first end of the inductor to the input voltage and electrically connects the second end of the inductor to the ground.

The objectives, technical details, features, and effects of the present invention will be better understood with regard to the detailed description of the embodiments below.

DESCRIPTION OF THE PREFERRED EMBODIMENTS

The drawings as referred to throughout the description of the present invention are for illustration only, to show the interrelations between the circuits and the signal waveforms, but not drawn according to actual scale.

Figure 1A:
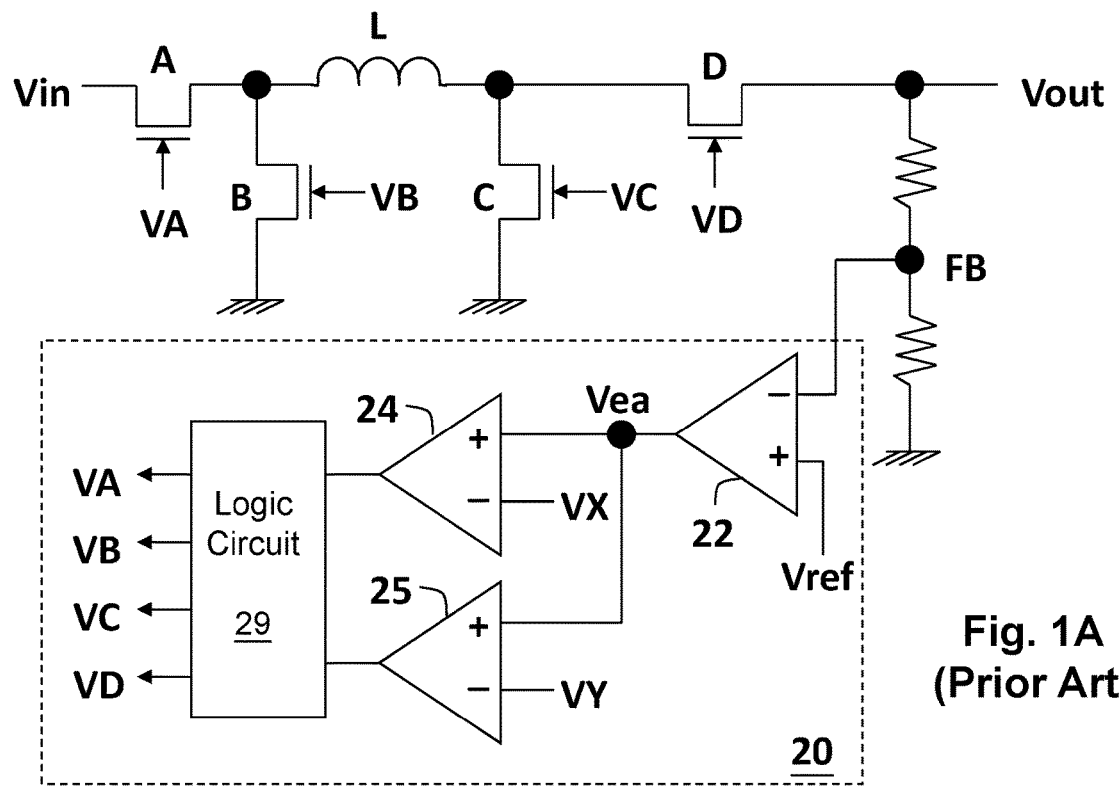
FIG. 1A shows a schematic diagram of a prior art buck-boost switching regulator.
Figure 1B:
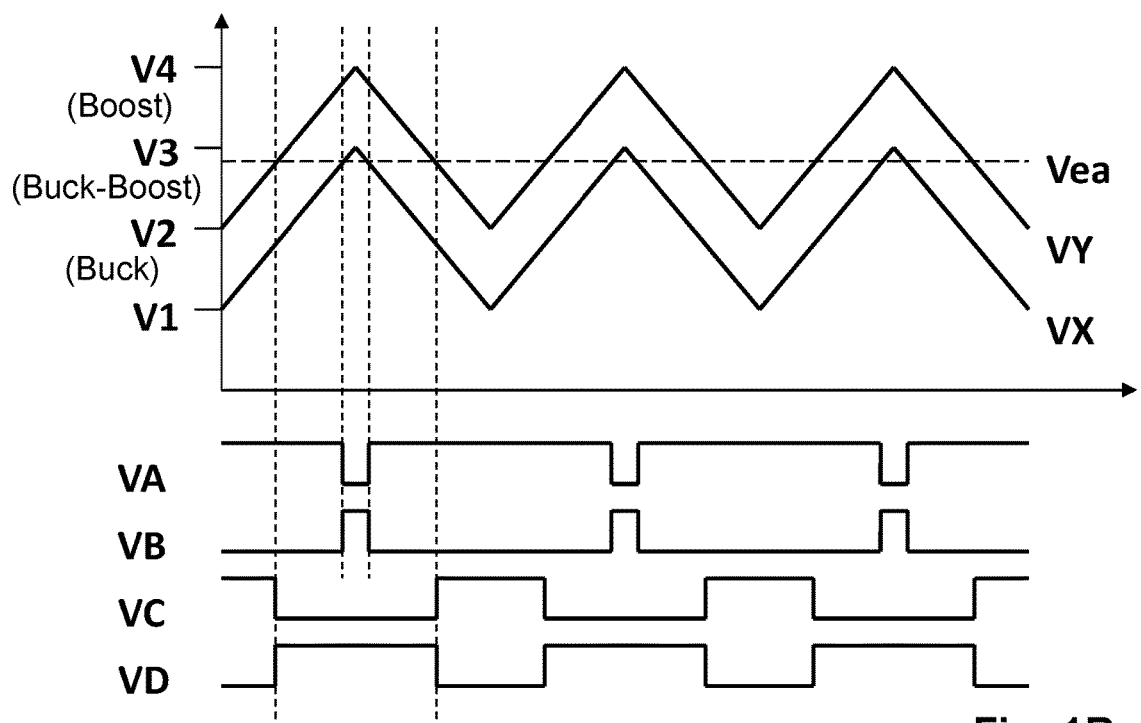
FIG. 1B shows signal waveforms corresponding to the circuit of FIG. 1A.
Figure 2A:
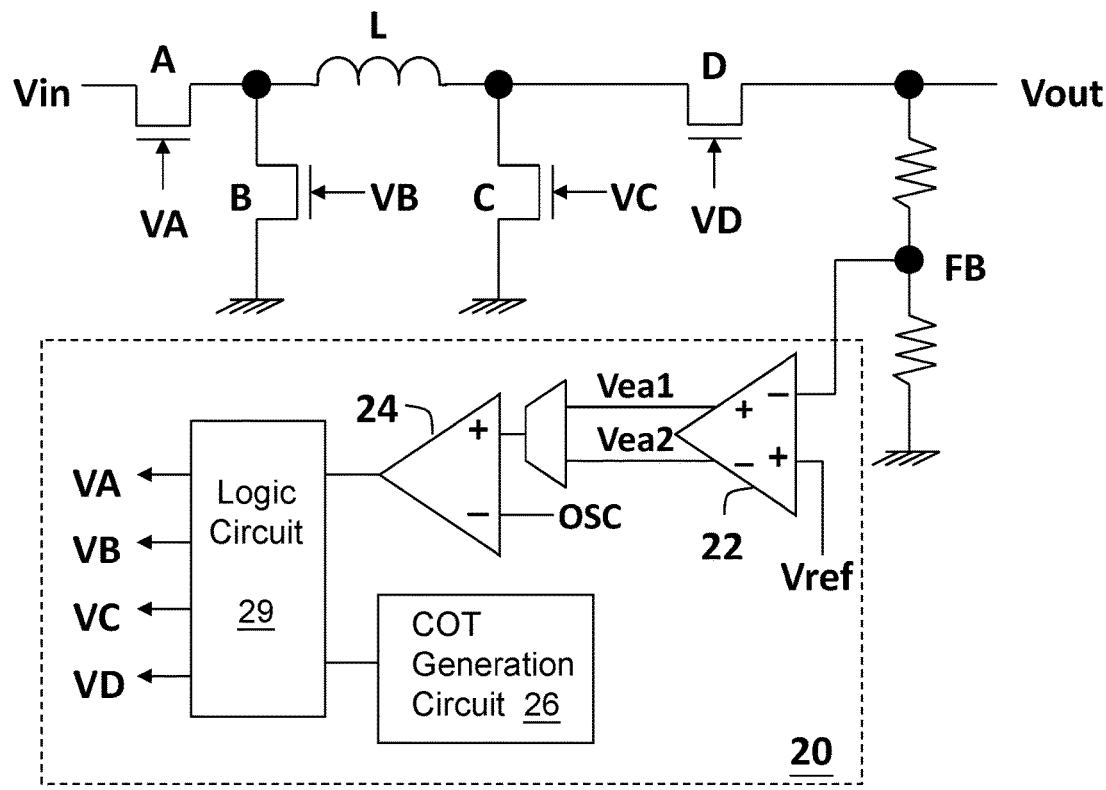
FIG. 2A shows a schematic diagram of a prior art constant ON-time buck-boost switching regulator.
Figure 2B:
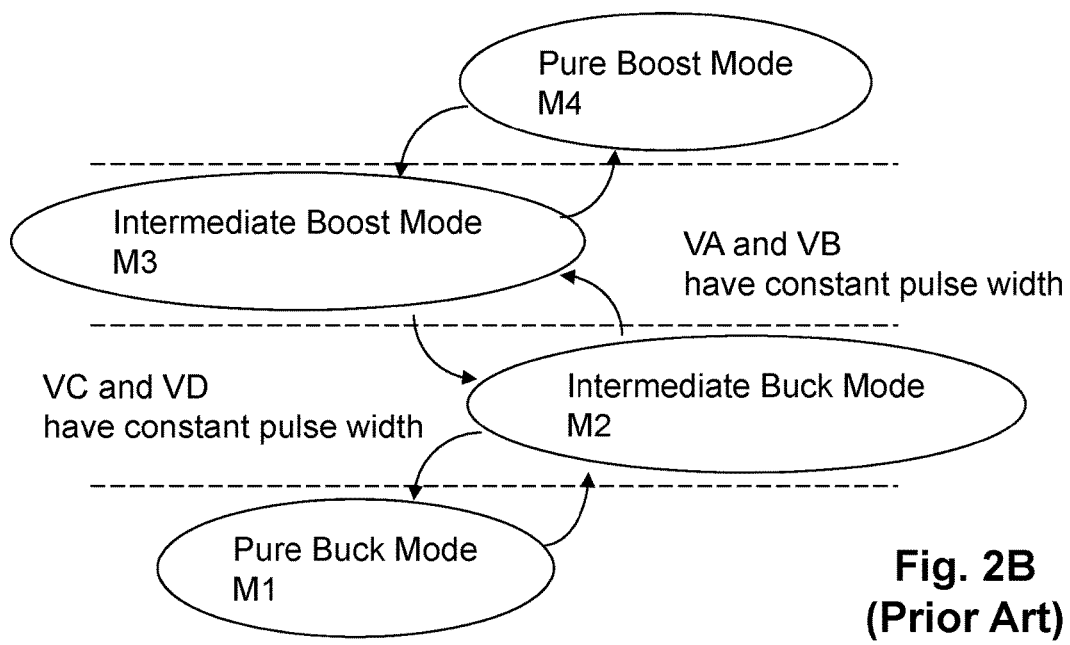
FIG. 2B shows signal waveforms corresponding to the circuit of FIG. 2A.
Figure 3A:
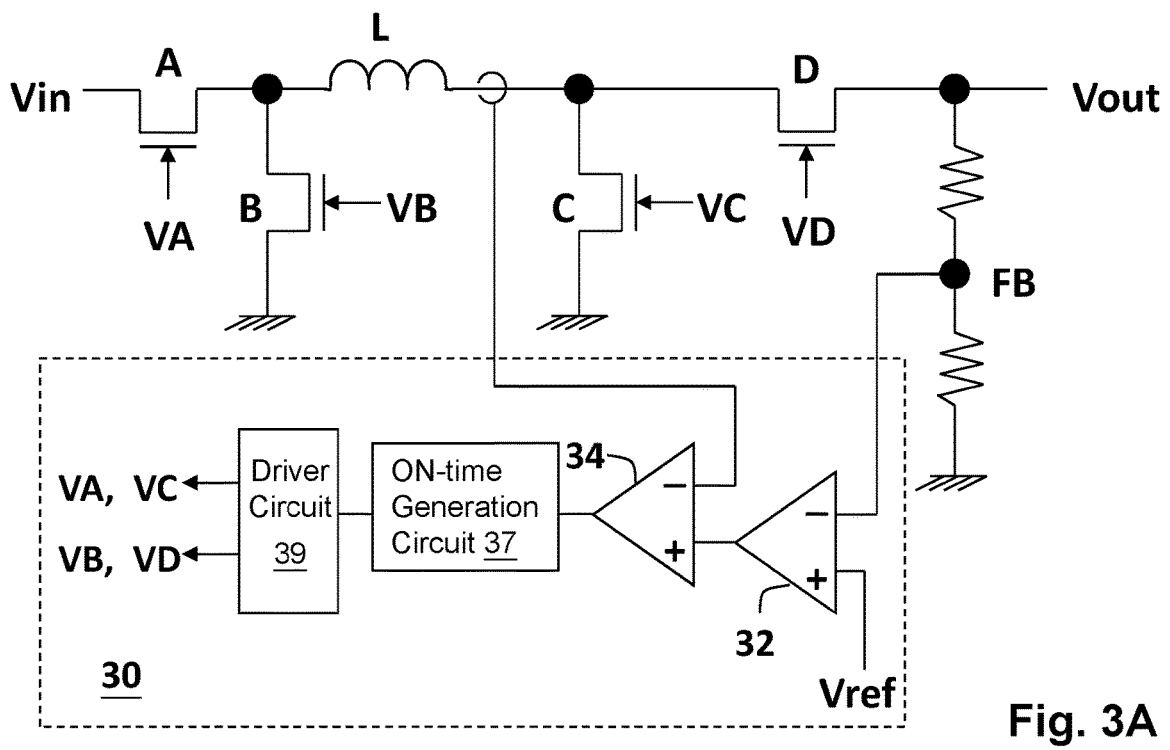
FIG. 3A shows a schematic diagram of a prior art constant time buck-boost switching regulator.
Figure 3B:
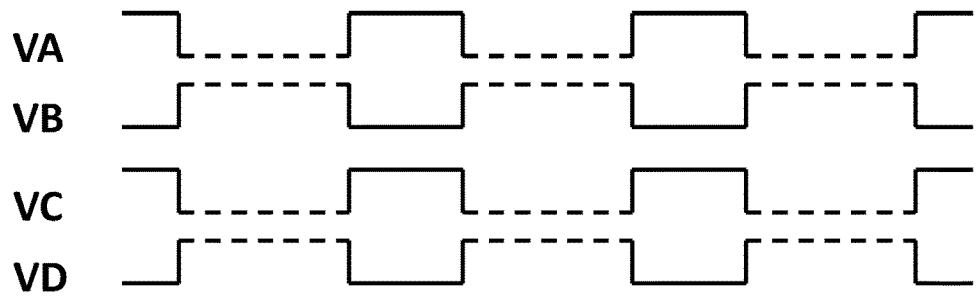
FIG. 3B shows signal waveforms corresponding to the circuit of FIG. 3A.
Figure 3C:
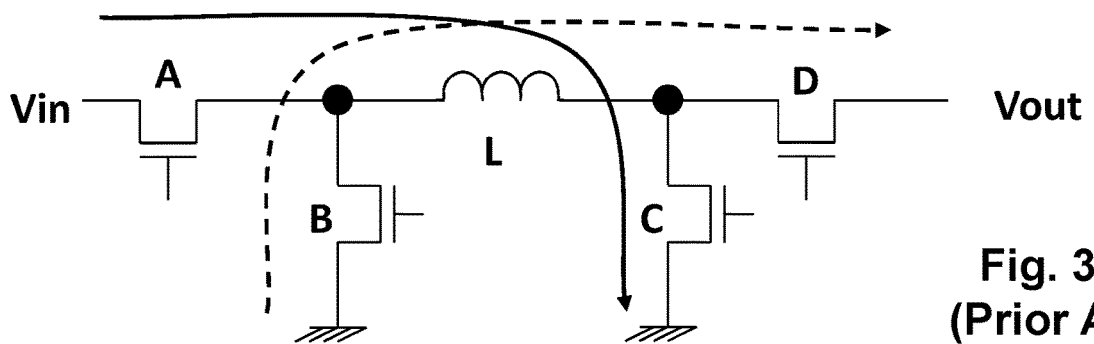
FIG. 3C shows current paths corresponding to the circuit of FIG. 3A.
Figure 4A:
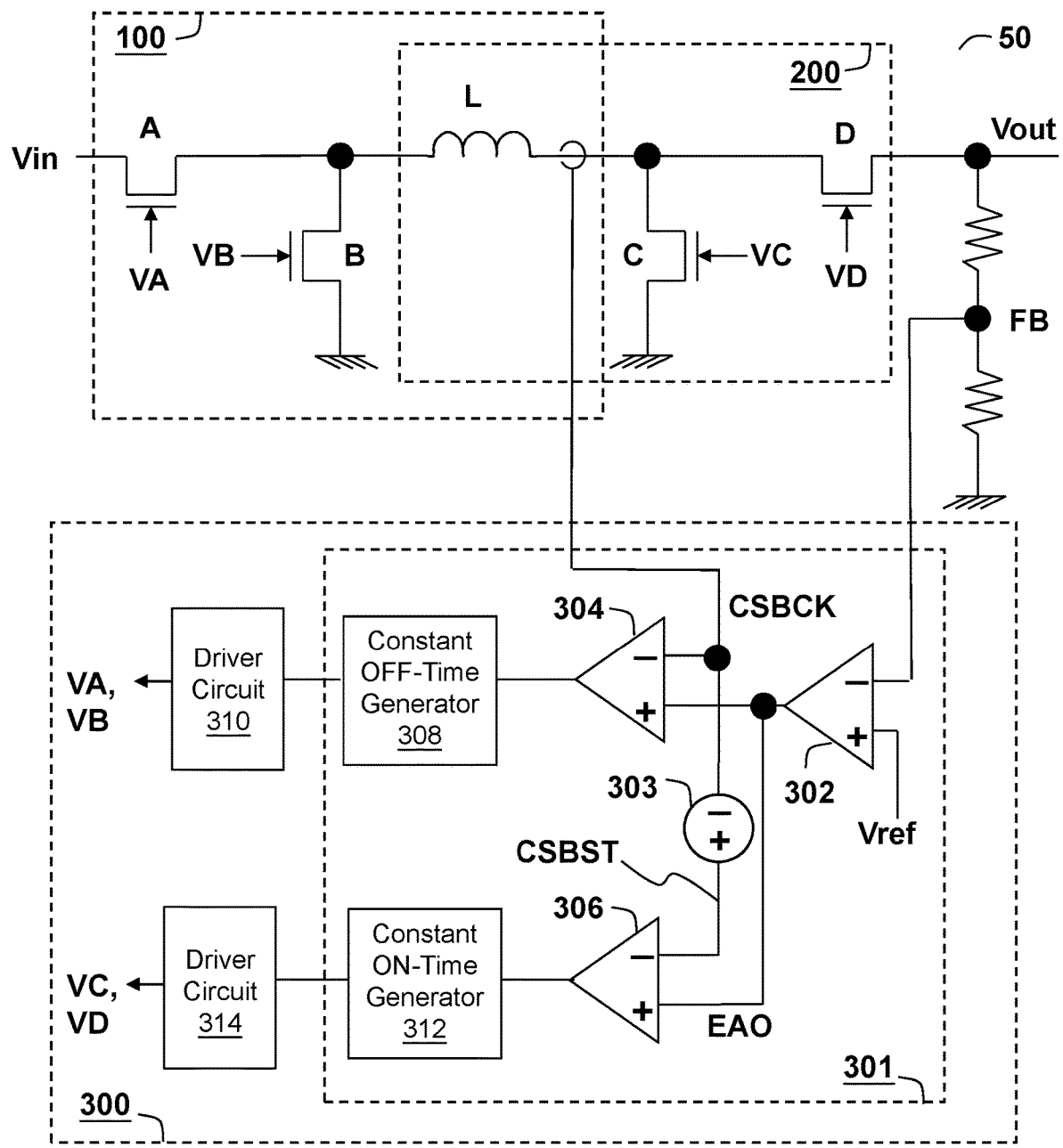
FIG. 4A shows a schematic diagram of a prior art constant time buck-boost switching regulator.
Figure 4B:
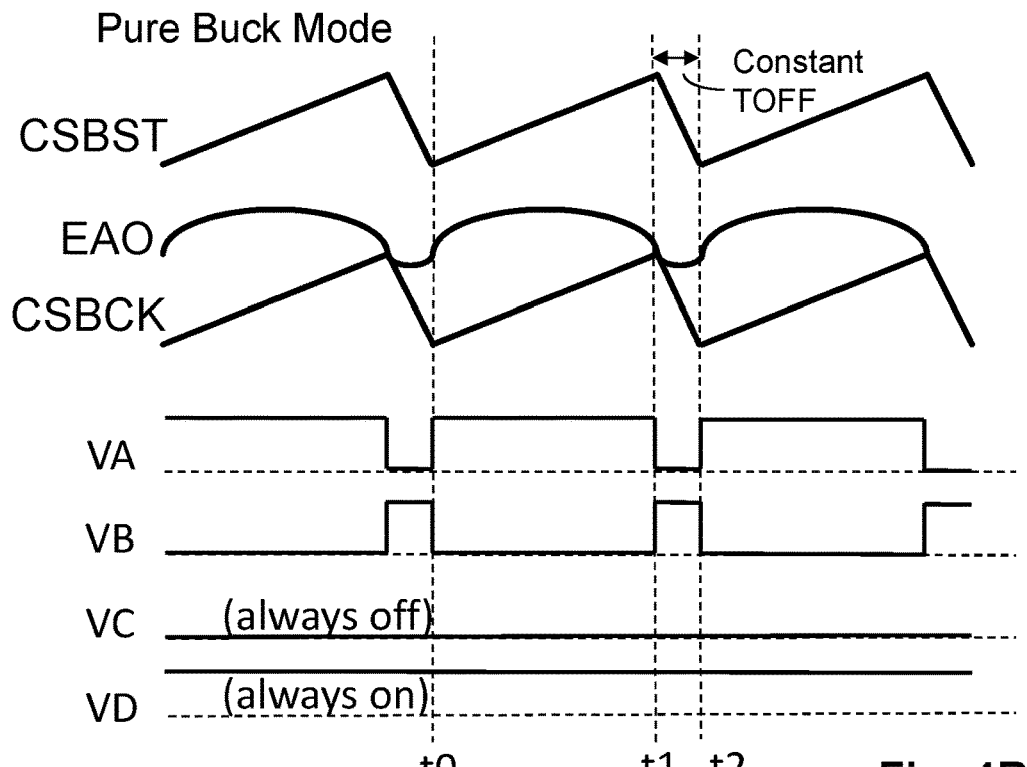
FIGS. 4B-4C show signal waveforms corresponding to the circuit of FIG. 4A.
Figure 4C:
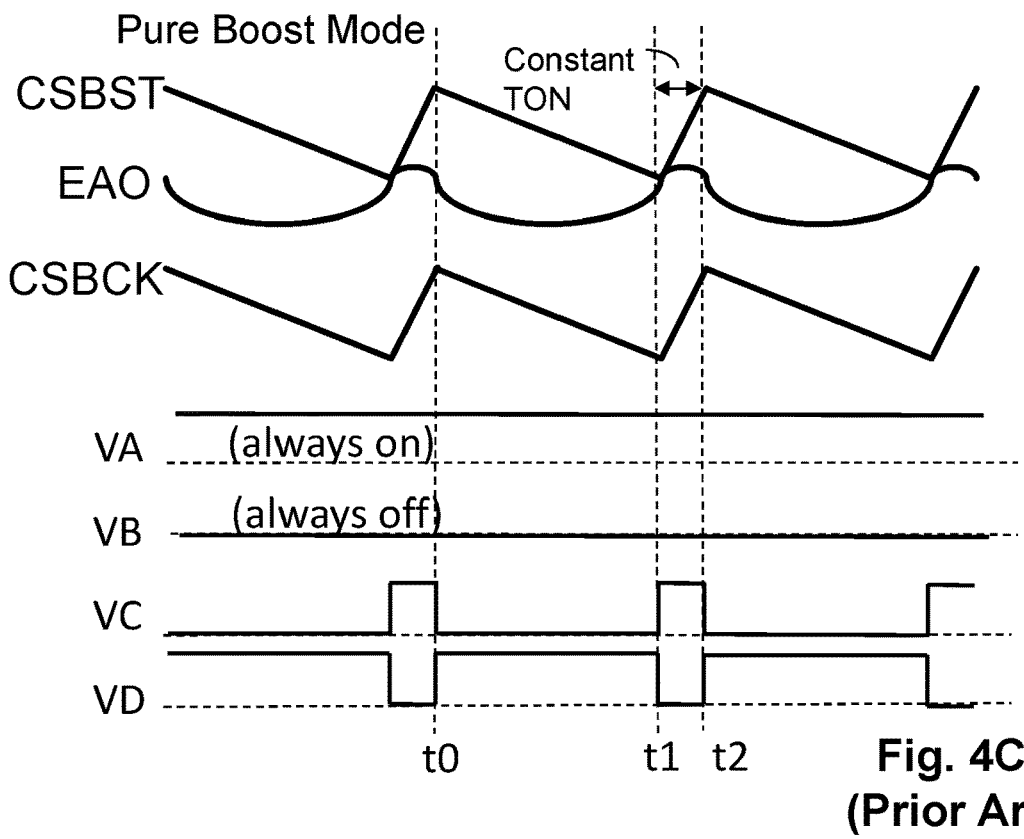
Figure 4D:
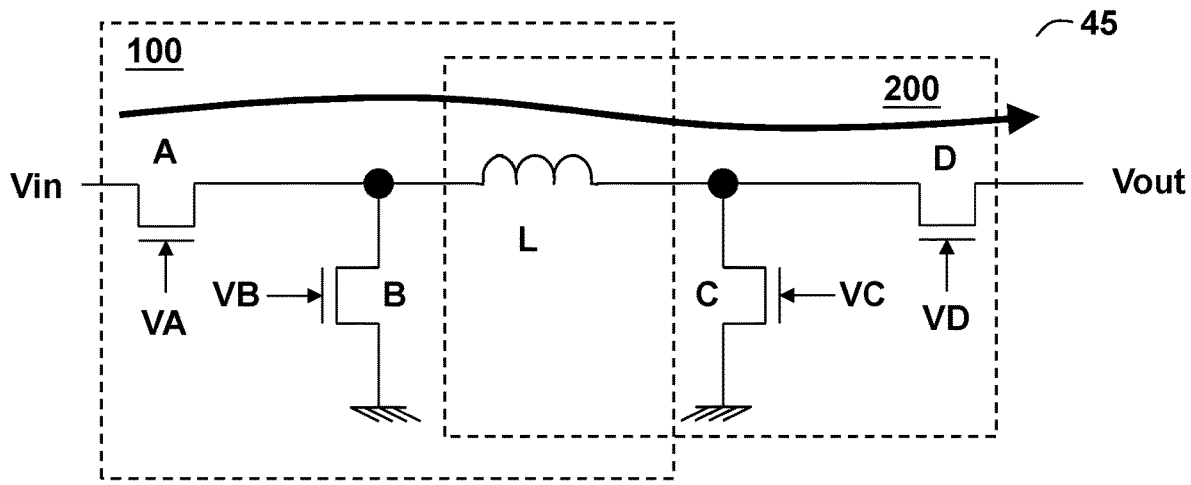
FIG. 4D shows current paths corresponding to the circuit of FIG. 4A.
Figure 5:
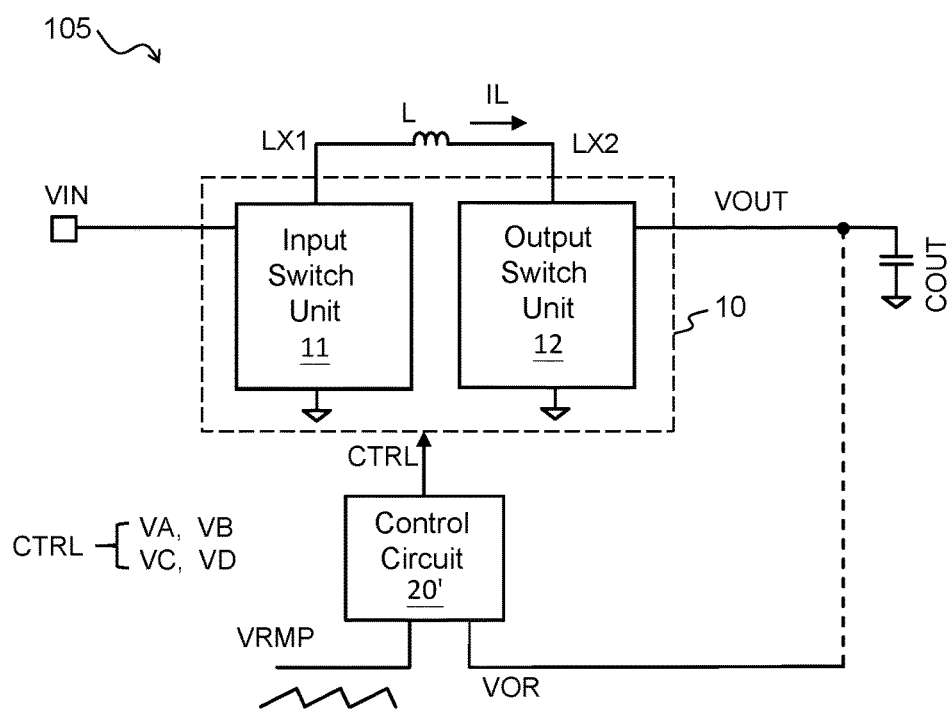
FIG. 5 shows an embodiment of a constant time buck-boost switching regulator according to the present invention.

FIG. 5 shows an embodiment of a constant time buck-boost switching regulator according to the present invention (constant time buck-boost switching regulator 105). The constant time buck-boost switching regulator 105 includes a power switch circuit 10 and a control circuit 20'.

The power switch circuit 10 includes an input switch unit 11 and an output switch unit 12; the input switch unit 11 switches a first end (i.e. LX1 in FIG. 5) of an inductor L between the input voltage VIN and ground, and the output switch unit 12 switches a second end (i.e. LX2 in FIG. 5) of the inductor L between the output voltage VOUT and ground. From one aspect, the power switch circuit 10 and the inductor L form a buck-boost switching regulator for converting the input voltage VIN to the output voltage VOUT, wherein the input voltage VIN can be higher than, close to, or smaller than the output voltage VOUT.

Referring to FIG. 5, the control circuit 20' is configured to control the power switch circuit 10 (for example by the switch control signal CTRL in FIG. 5) to operate in a first, second or third state. In the first state, the power switch circuit 10 electrically connects the first end of the inductor L to the input voltage VIN and the second end of the inductor L to the output voltage VOUT; in the second state, the power switch circuit 10 electrically connects the first end of the inductor L to ground and the second end of the inductor L to the output voltage VOUT; in the third state, the power switch circuit 10 electrically connects the first end of the inductor L to the input voltage VIN and the second end of the inductor L to ground.

According to the present invention, when a ramp signal VRMP intersects a feedback related signal VOR, the control circuit 20' controls the power switch circuit 10 to enter the first state and maintain in the first state for a constant time TAD (to be explained in detail referring to FIGS. 8A-8C), and when the constant time TAD ends, the control circuit 20' judges whether the ramp signal VRMP exceeds the feedback related signal VOR; if the ramp signal VRMP exceeds the feedback related signal VOR, then the power switch circuit 10 is controlled to enter the second state, while if the ramp signal VRMP does not exceed the feedback related signal VOR, then the power switch circuit 10 is controlled to enter the third state. In one embodiment, the ramp signal VRMP is related to an inductor current IL flowing through the inductor L; in another embodiment, the ramp signal VRMP is an artificial signal simulating an electric characteristic of the inductor current IL (for example but not limited to simulating a slope, a turning point or a phase of the inductor current IL). The feedback related signal VOR is related to the output voltage VOUT. Embodiments as to how the ramp signal VRMP and the feedback related signal VOR are generated will be explained in detail later. In addition, in another embodiment, the ramp signal VRMP does not have to be related to the inductor current IL flowing through the inductor L.

Figure 6A:
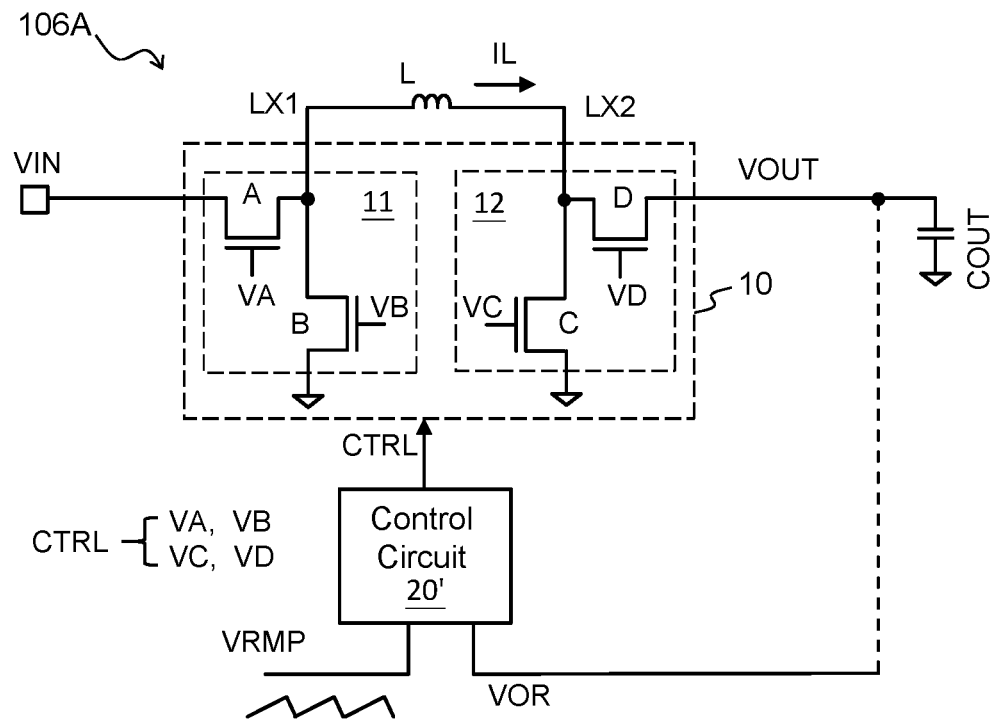
FIGS. 6A-6B show two embodiments of the power switch circuit in the constant time buck-boost switching regulator according to the present invention.
Figure 6B:
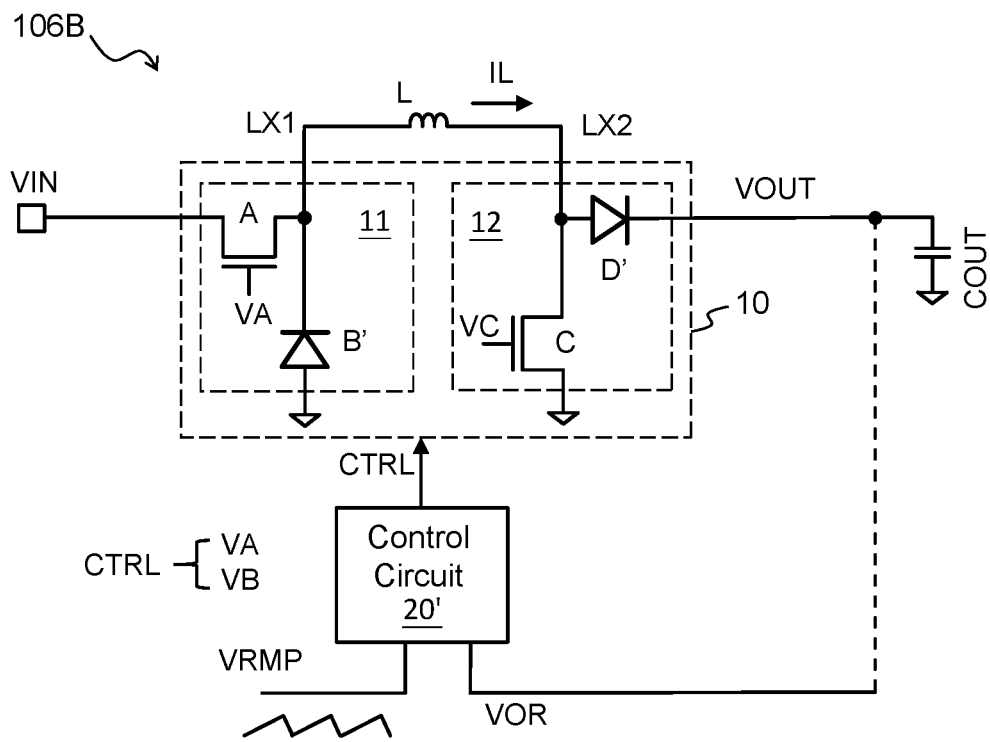

FIGS. 6A-6B show two embodiments of the power switch circuit (10) in the constant time buck-boost switching regulator (106A or 106B) according to the present invention.

As shown in FIG. 6A, in one embodiment, the input switch unit 11 includes an input upper switch A and an input lower switch B, wherein the input upper switch A is coupled between the input voltage VIN and the first end of the inductor L, and the input lower switch B is coupled between ground and the first end of the inductor L. In this embodiment, the switch control signal CTRL provided by the control circuit 20' includes switch control signals VA and VB, respectively controlling the input upper switch A and the input lower switch B, to electrically connect the first end of the inductor L to the input voltage VIN or ground.

Still referring to FIG. 6A, in one embodiment, the output switch unit 12 includes an output lower switch C and an output upper switch D, wherein the output lower switch C is coupled between ground and the second end of the inductor L, and the output upper switch D is coupled between the output voltage VOUT and the second end of the inductor L. In this embodiment, the switch control signal CTRL provided by the control circuit 20' includes switch control signals VC and VD, respectively controlling the output lower switch C and the output upper switch D, to electrically connect the second end of the inductor L to ground or the output voltage VOUT.

The embodiment shown in FIG. 6A is a synchronous type switching regulator. However, the present invention is also applicable to a non-synchronous type switching regulator, as described below.

As shown in FIG. 6B, in one embodiment, the input switch unit 11 includes an input upper switch A and an input lower diode B', wherein the input upper switch A is coupled between the input voltage VIN and the first end of the inductor L, and the input lower diode B' is coupled between ground and the first end of the inductor L; more specifically, the current inflow end of the input lower diode B' is coupled to ground, and the current outflow end of the input lower diode B' is coupled to the first end of the inductor L. In this embodiment, the switch control signal CTRL provided by the control circuit 20' includes a switch control signal VA, controlling the input upper switch A to electrically connect the first end of the inductor L to the input voltage VIN or ground.

Still referring to FIG. 6B, in one embodiment, the output switch unit 12 includes an output lower switch C and an output upper diode D', wherein the output lower switch C is coupled between ground and the second end of the inductor L, and the output upper diode D' is coupled between the output voltage VOUT and the second end of the inductor L; more specifically, the current inflow end of the output upper diode D' is coupled to the second end of the inductor L, and the current outflow end of the output upper diode D' is coupled to the output voltage VOUT. In this embodiment, the switch control signal CTRL provided by the control circuit 20' includes a switch control signal VC, controlling the output lower switch C to electrically connect the second end of the inductor L to ground or the output voltage VOUT.

For simplification, the input upper switch A, input lower switch B, output lower switch C and output upper switch D are referred to as switches A, B, C and D.

Figure 7:
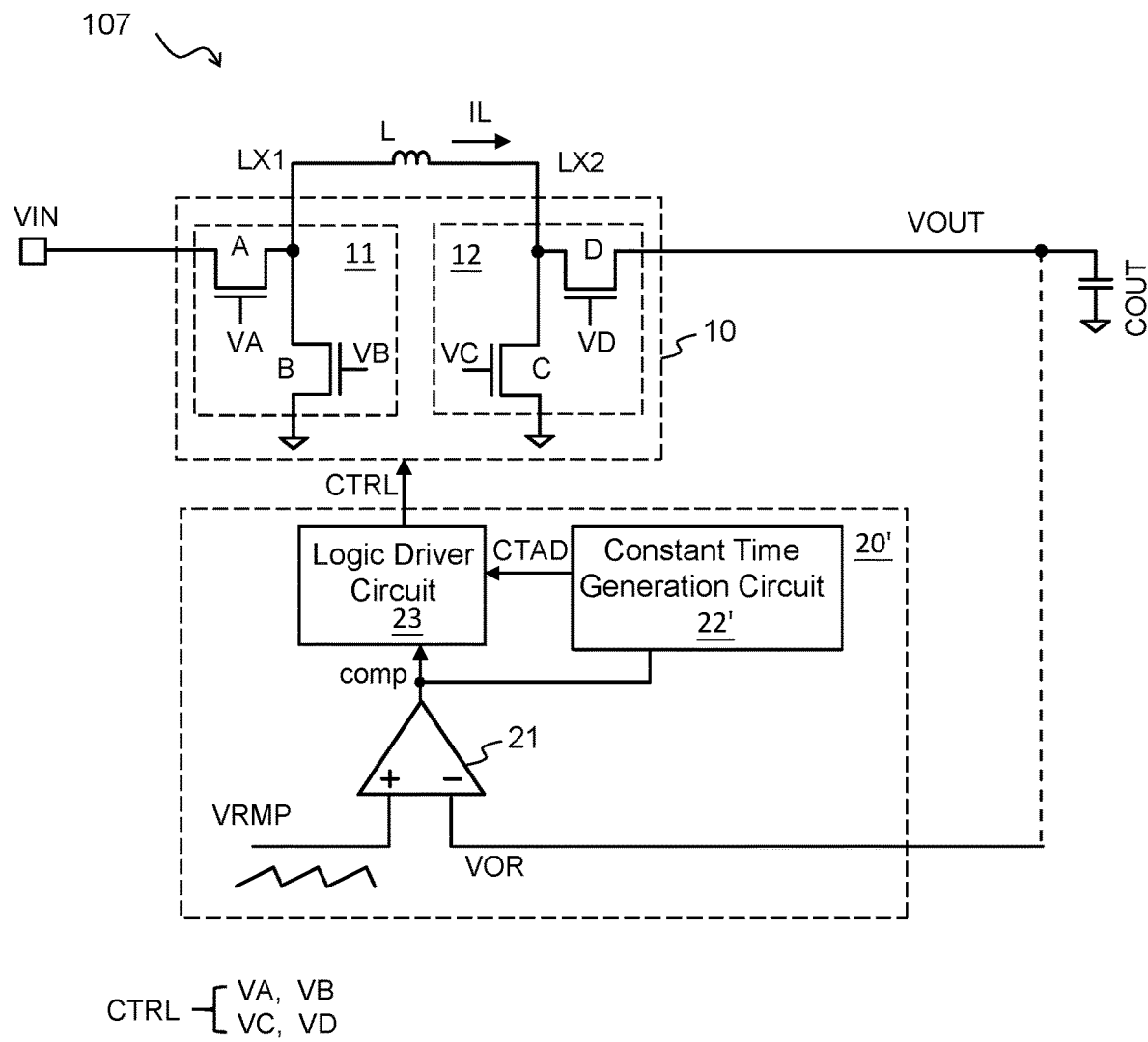
FIG. 7 shows a specific embodiment of a control circuit of the constant time buck-boost switching regulator according to the present invention.
Figure 8A:
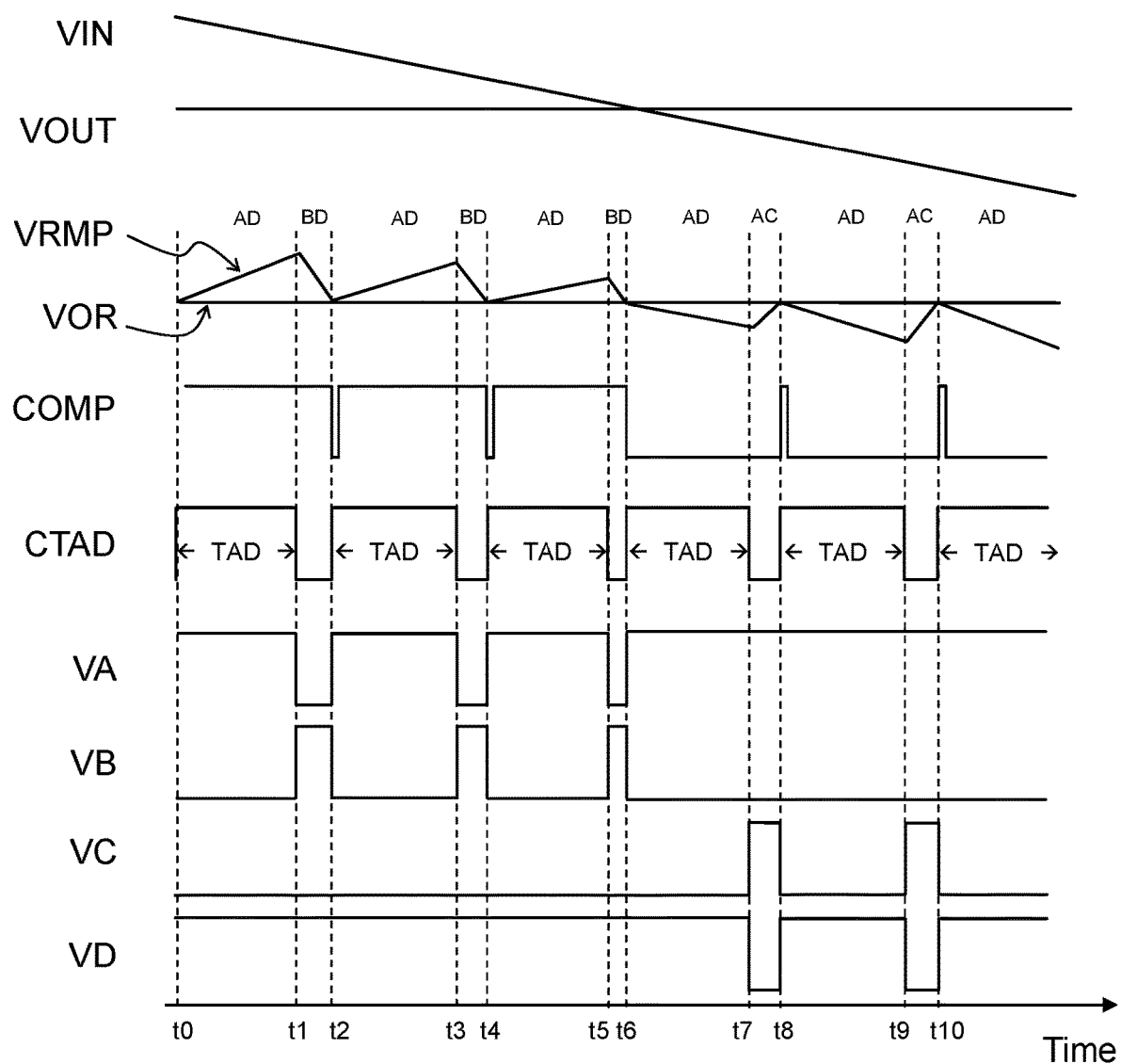
FIGS. 8A-8C show signal waveforms corresponding to the constant time buck-boost switching regulator according to the present invention.
Figure 8B:
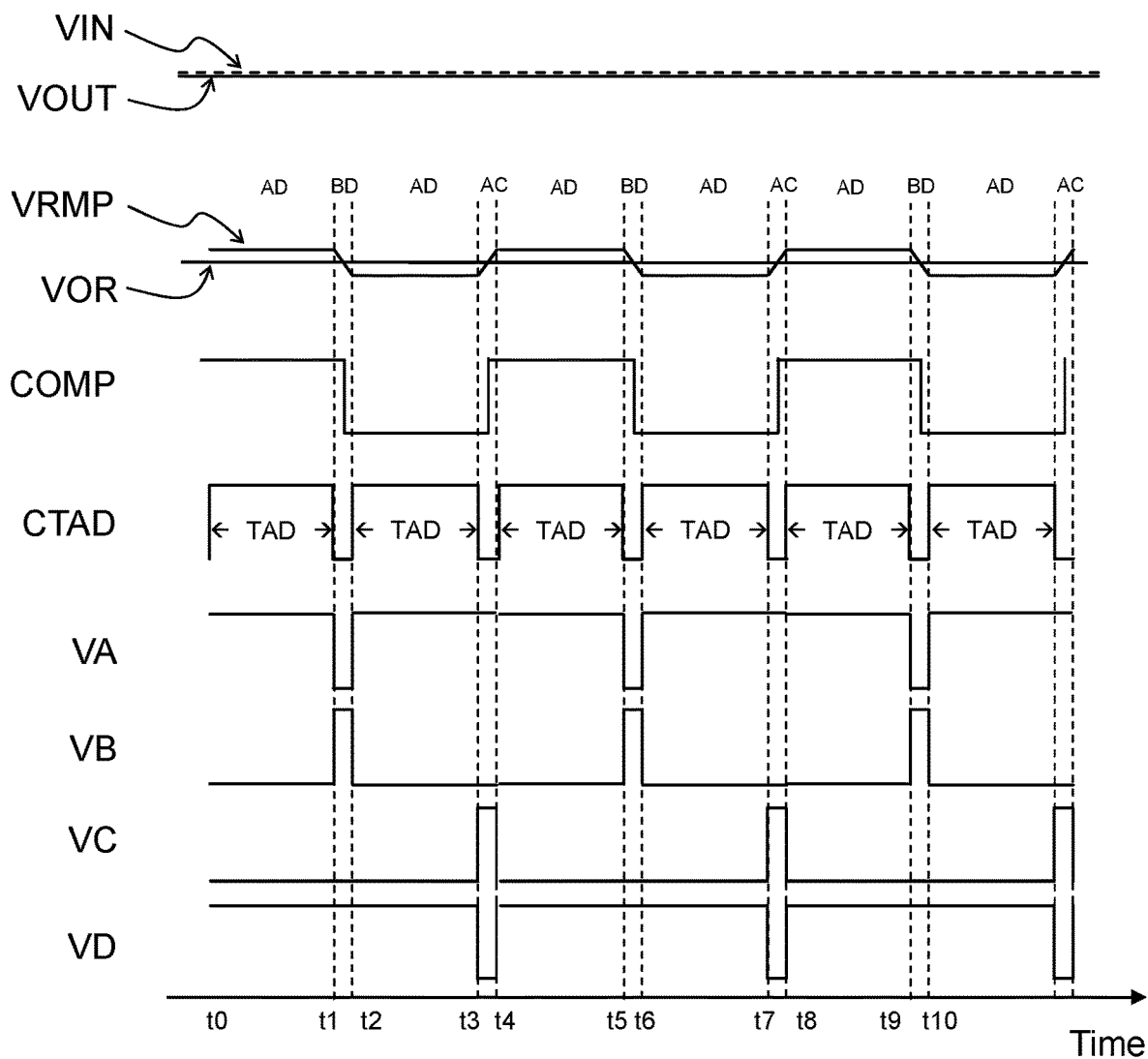

Please refer to FIG. 7 together with FIGS. 8A-8B. FIG. 7 shows a specific embodiment of a control circuit (20) of the constant time buck-boost switching regulator (107) according to the present invention. FIGS. 8A-8B show signal waveforms corresponding to the constant time buck-boost switching regulator according to the present invention.

As shown in FIG. 7, in one embodiment, the control circuit 20' includes a comparison circuit 21, a constant time generation circuit 22' and a logic driver circuit 23. The comparison circuit 21 is configured to operably compare the ramp signal VRMP with the feedback related signal VOR to generate a comparison output signal COMP. The constant time generation circuit 22' is configured to operably trigger a constant time TAD according to the comparison output signal COMP, when the ramp signal VRMP intersects the feedback related signal VOR. The logic driver circuit 23 is coupled to the comparison circuit 21 and the constant time generation circuit 22'; the logic driver circuit 23 is configured to operably control the power switch circuit 10 to enter the first state and maintain in the first state for the constant time TAD, and control the power switch circuit 10 to enter the second or third state when the constant time TAD ends according to a level of the comparison output signal COMP.

Referring to FIGS. 7 and 8A, as an example, when the input voltage VIN is higher than the output voltage VOUT (e.g. before time point t5), the constant time buck-boost switching regulator according to the present invention operates in buck power conversion mode; in this mode, when the ramp signal VRMP intersects the feedback related signal VOR (such as at time point t2 or t4, the ramp signal VRMP falls down to intersect the feedback related signal VOR, causing a short low-level pulse in the comparison output signal COMP), the comparison output signal COMP triggers a constant time TAD (for example the constant time generation circuit 22' is triggered by the comparison output signal COMP to generate a constant time signal CTAD having a high-level pulse width equal to the constant time TAD, such as t2-t3 or t4-t5 in FIG. 8A), and the power switch circuit 10 enters the first state during this constant time TAD, i.e., the switches A and D are ON and the switches B and C are OFF. Next, when the constant time TAD ends (such as at time point t3 or t5), the power switch circuit 10 enters the second or third state, depending on the level of the comparison output signal COMP. In the shown embodiment, the comparison output signal COMP is at high level at time point t3 or t5, so, the logic driver circuit 23 determines to enter the second state, that is, as shown by t3-t4 or t5-t6 in FIG. 8A, the switches B and D are ON and the switches A and C are OFF.

On the other hand, when the input voltage VIN is lower than the output voltage VOUT (e.g. after time point t6), the constant time buck-boost switching regulator according to the present invention operates in boost power conversion mode; in this mode, when the ramp signal VRMP intersects the feedback related signal VOR (such as at time point t8 or t10, the ramp signal VRMP rises to intersect the feedback related signal VOR, causing a short high-level pulse in the comparison output signal COMP), the comparison output signal COMP triggers the constant time TAD (such as t6-t7 or t8-t9 in FIG. 8A), and the power switch circuit 10 enters the first state during this constant time TAD, i.e., the switches A and D are ON and the switches B and C are OFF. Next, when the constant time TAD ends (such as at time point t7 or t9), the power switch circuit 10 enters the second or third state, depending on the level of the comparison output signal COMP. In the shown embodiment, the comparison output signal COMP is at low level at time point t7 or t9, so, the logic driver circuit 23 determines to enter the third state, that is, as shown by t7-t8 or t9-t10 in FIG. 8A, the switches A and C are ON and the switches B and D are OFF.

Note that "falling down to intersect" and "rising to intersect" in the above description are examples based on the shown embodiment. If the polarities of the signals are arranged differently (for example, "high level active" is changed to "low level active"), "falling down" may become "rising" and "rising" may become "falling down", so the direction of the ramp is not to limit the scope of the present invention.

Figure 9:
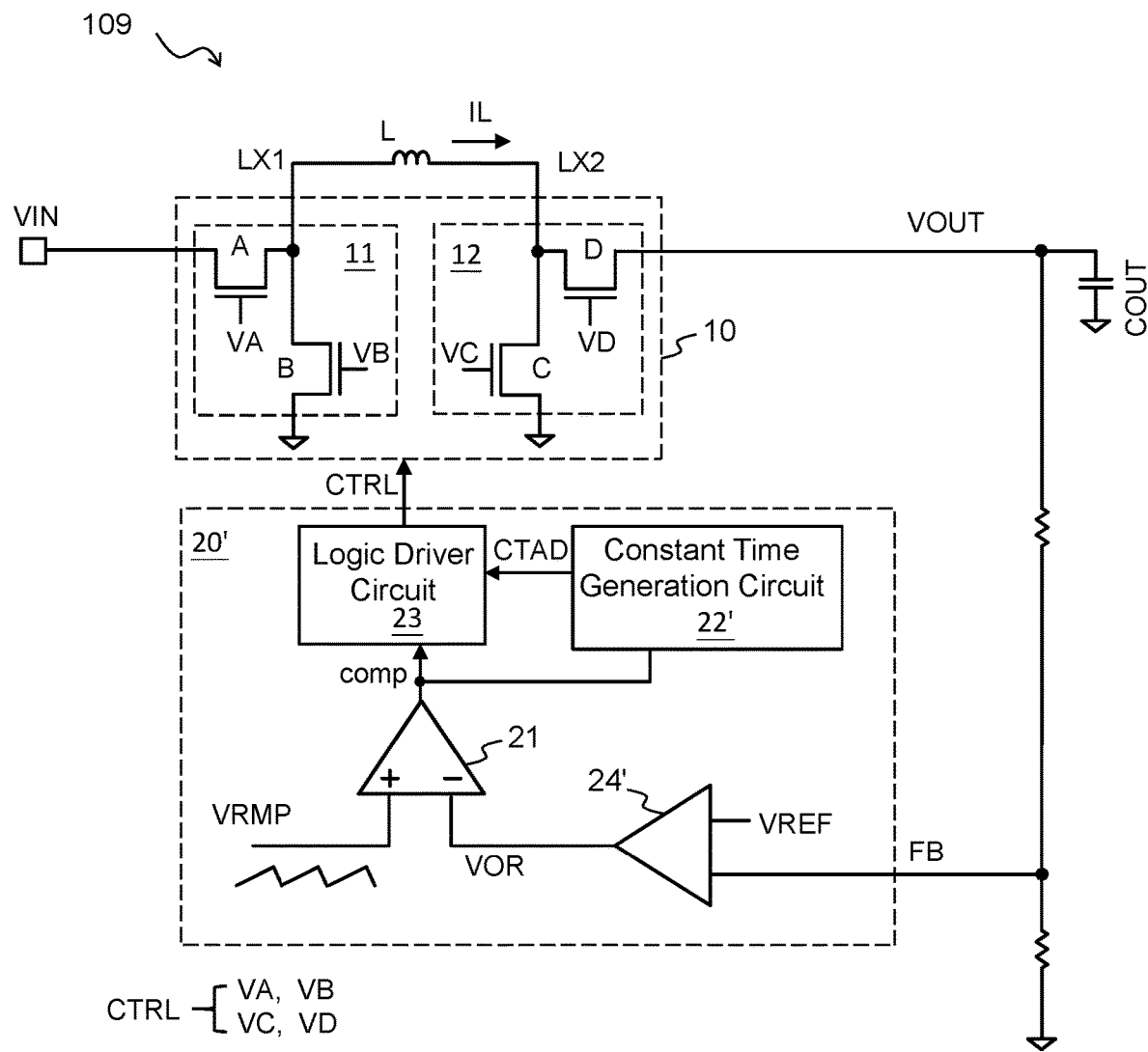
FIG. 9 shows another specific embodiment of a control circuit of the constant time buck-boost switching regulator according to the present invention.

FIG. 9 shows another specific embodiment of a control circuit (20') of the constant time buck-boost switching regulator (109) according to the present invention. In this embodiment, the control circuit 20' further includes an error amplifier circuit 24', which is configured to operably generate the feedback related signal VOR according to a difference between the feedback signal FB which is related to the output voltage VOUT and a reference voltage VREF. As shown in the figure, in one embodiment, the feedback signal FB is a divided voltage of the output voltage VOUT. In another embodiment, the feedback signal FB is the output voltage VOUT itself. In one embodiment, the feedback related signal VOR changes in a direction opposite to the output voltage VOUT, that is, when the output voltage VOUT increases, the feedback related signal VOR decreases, and when the output voltage VOUT decreases, the feedback related signal VOR increases.

Figure 10:
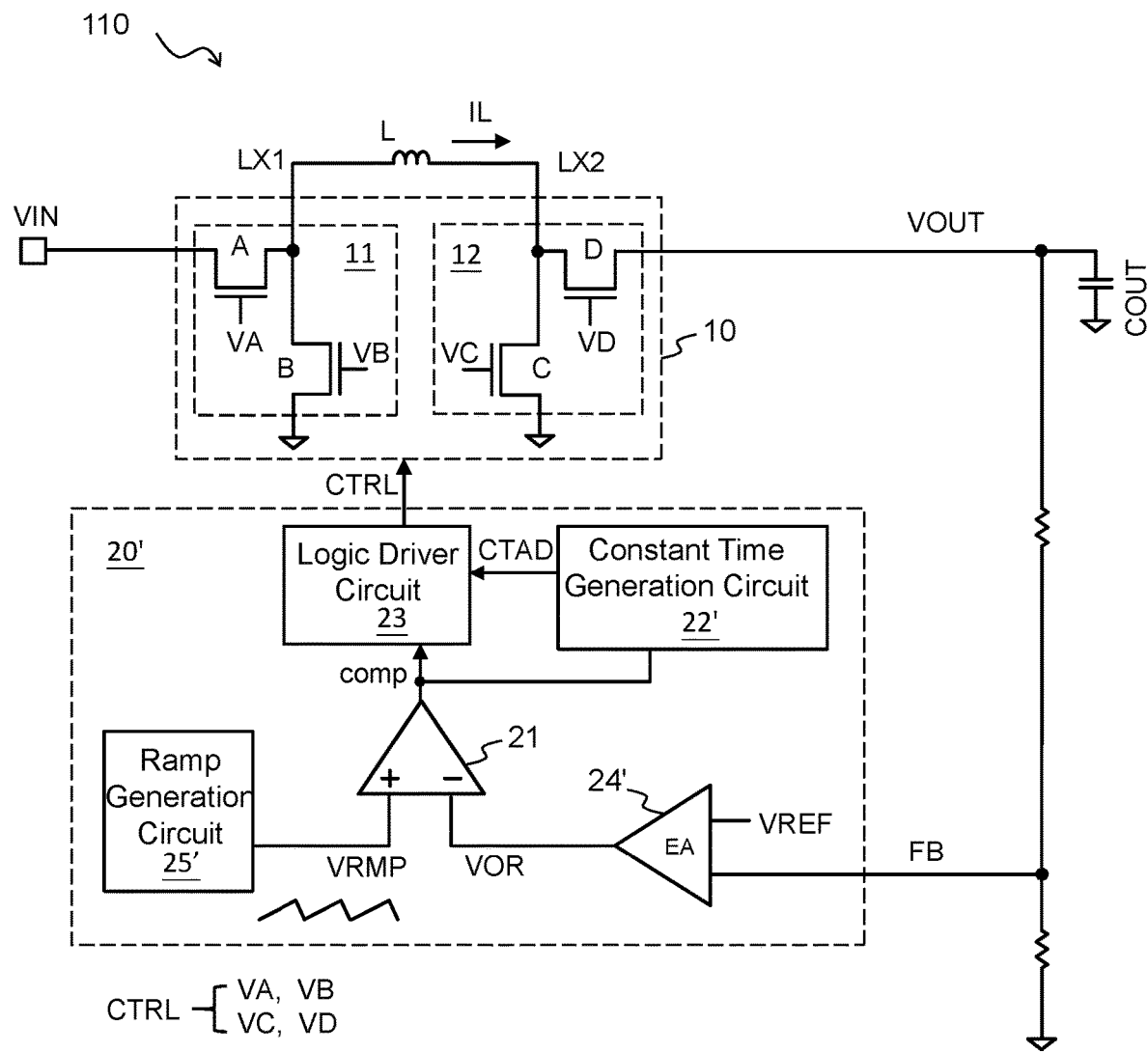
FIG. 10 shows another specific embodiment of a control circuit of the constant time buck-boost switching regulator according to the present invention.

FIG. 10 shows another specific embodiment of a control circuit (20') of the constant time buck-boost switching regulator (110) according to the present invention. In this embodiment, the control circuit 20' further includes a ramp generation circuit 25', which is configured to operably generate the ramp signal VRMP. In one embodiment, the ramp signal VRMP is proportional to the inductor current IL. In one embodiment, the feedback related signal VOR corresponds to a stable state value. More specifically, in the embodiment wherein the ramp signal VRMP is proportional to the inductor current IL, after the control circuit 20' controls the power switch circuit 10 to enter the first state and maintain in the first state for the constant time TAD, when the ramp signal VRMP exceeds the stable state value, the power switch circuit 10 enters the second state, and when the ramp signal VRMP does not exceed the stable state value, the power switch circuit 10 enters the third state. From one perspective, the stable state value can be regarded as indicating a stable state of the operation of the constant time buck-boost switching regulator.

Referring to FIG. 8A, such as at time point t3, after the constant time TAD ends, the ramp signal VRMP (corresponding to the inductor current IL) is higher than the stable state value (corresponding to the feedback related signal VOR), which means that the inductor current IL is higher than what the load circuit requires, so the inductor current IL needs to be reduced. Thus, the control circuit 20' controls the power switch circuit 10 to enter the second state, i.e., as shown by t3-t4 in FIG. 8A, the switches B and D are ON and the switches A and C are OFF, such that the ramp signal VRMP (corresponding to the inductor current IL) decreases, until the next time that the ramp signal VRMP intersects the feedback related signal VOR again and the control circuit 20' again controls the power switch circuit 10 to enter the first state and maintain in the first state for the constant time TAD.

On the other hand, for example at time point t7 in FIG. 8A, after the constant time TAD ends, the ramp signal VRMP (corresponding to the inductor current IL) is lower than the stable state value (corresponding to the feedback related signal VOR), which means that the inductor current IL is lower than what the load circuit requires, so the inductor current IL needs to be increased. Thus, the control circuit 20' controls the power switch circuit 10 to enter the third state, i.e., as shown by t7-t8 in FIG. 8A, the switches A and C are ON and the switches B and D are OFF, such that the ramp signal VRMP (corresponding to the inductor current IL) increases, until the next time that the ramp signal VRMP intersects the feedback related signal VOR again and the control circuit 20' again controls the power switch circuit 10 to enter the first state and maintain in the first state for the constant time TAD.

That the ramp signal VRMP is related to or proportional to the inductor current IL, in one embodiment, means that the ramp signal VRMP is related to or proportional to both the alternating current component and the direct current component of the inductor current IL; in another embodiment, it means that the ramp signal VRMP is related to or proportional to only the alternating current component but not the direct current component of the inductor current IL.

Figure 11:
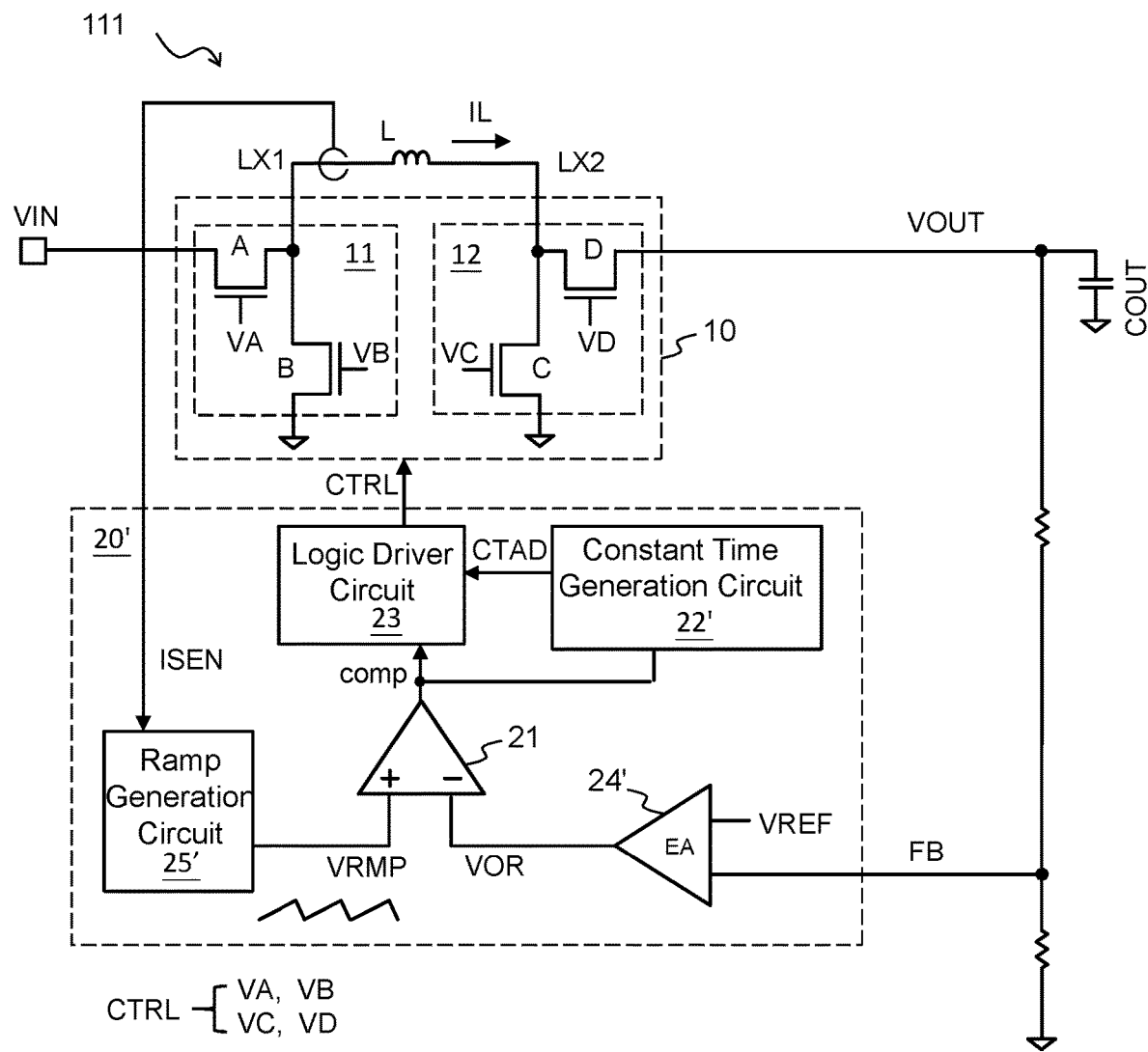
FIG. 11 shows another specific embodiment of a control circuit of the constant time buck-boost switching regulator according to the present invention.

FIG. 11 shows another specific embodiment of a control circuit (20') of the constant time buck-boost switching regulator (111) according to the present invention. In this embodiment, the ramp generation circuit 25' senses the inductor current IL and generates the ramp signal VRMP according to the inductor current IL (e.g. according to the current sense signal ISSN).

Figure 12:
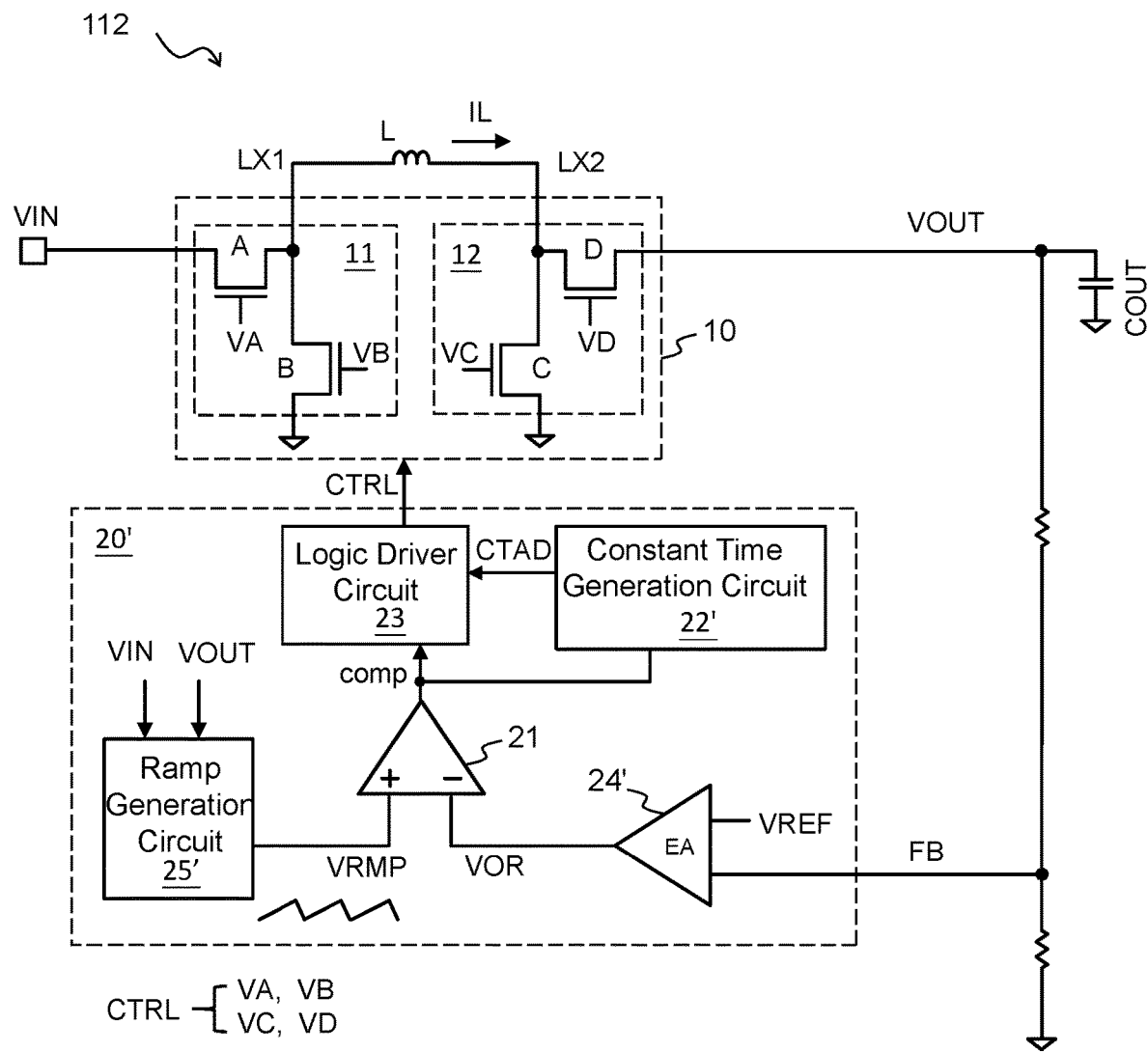
FIG. 12 shows another specific embodiment of a control circuit of the constant time buck-boost switching regulator according to the present invention.

FIG. 12 shows another specific embodiment of a control circuit (20') of the constant time buck-boost switching regulator (112) according to the present invention. In this embodiment, the ramp generation circuit 25' simulates the inductor current IL according to the input voltage VIN and the output voltage VOUT to generate the ramp signal VRMP.

In one embodiment, the ramp signal VRMP can be generated by combining the current sense and the simulation.

Referring to FIG. 8B, when the input voltage VIN is close to the output voltage VOUT, the constant time buck-boost switching regulator according to the present invention will alternatingly and sequentially operate in the first state, the second state, the first state, and the third state, repetitively (as shown in FIG. 8B, t4-t8 repeat t0-t4). More specifically, when the input voltage VIN is close to the output voltage VOUT, in the first state (wherein the switches A and D are ON and the switches B and C are OFF), the two ends of the inductor L are at about equal voltage levels, so the inductor current IL (corresponding to the ramp signal VRMP) neither increases nor decreases; in this case, according to the present invention, regardless whether the constant time buck-boost switching regulator is in buck power conversion mode (such as t0-t1 in FIG. 8B) or in boost power conversion mode (such as t2-t4 in FIG. 8B), the first state maintains for the same duration, which is the constant time TAD, and therefore the ON-time of the switches A and D will not be extended unlimitedly and the frequency of the buck-boost switching regulator will not decrease unlimitedly to cause noise interference, and the ripple in the output voltage is small. Further, the second state and the third state only last for a minimum time, so, as the frequency decrease is limited, the duty ratio of the first state (the duty ratio of the ON-time of the switches A and D) is increased, to increase the power conversion efficiency of the constant time buck-boost switching regulator according to the present invention. From another aspect, in one embodiment, the constant time buck-boost switching regulator according to the present invention always operate in either the buck power conversion mode or the boost power conversion mode, but not in buck-boost power conversion mode, and there is no intermediate mode, so the constant time buck-boost switching regulator according to the present invention has a better power conversion efficiency in comparison with the prior arts.

In addition, regardless whether the constant time buck-boost switching regulator according to the present invention is in buck power conversion mode (such as t0-t1 in FIG. 8B) or in boost power conversion mode (such as t2-t4 in FIG. 8B), the first state maintains for the same duration, which is the constant time TAD, so the circuit is simpler and the cost is lower, as compared with the prior arts.

It should be noted that the switching among the first, second and third states as illustrated above is given as an example to explain the main spirit of the present invention, and can be modified as required; for example, there can be a dead time between two states, to avoid a short current.

Figure 8C:
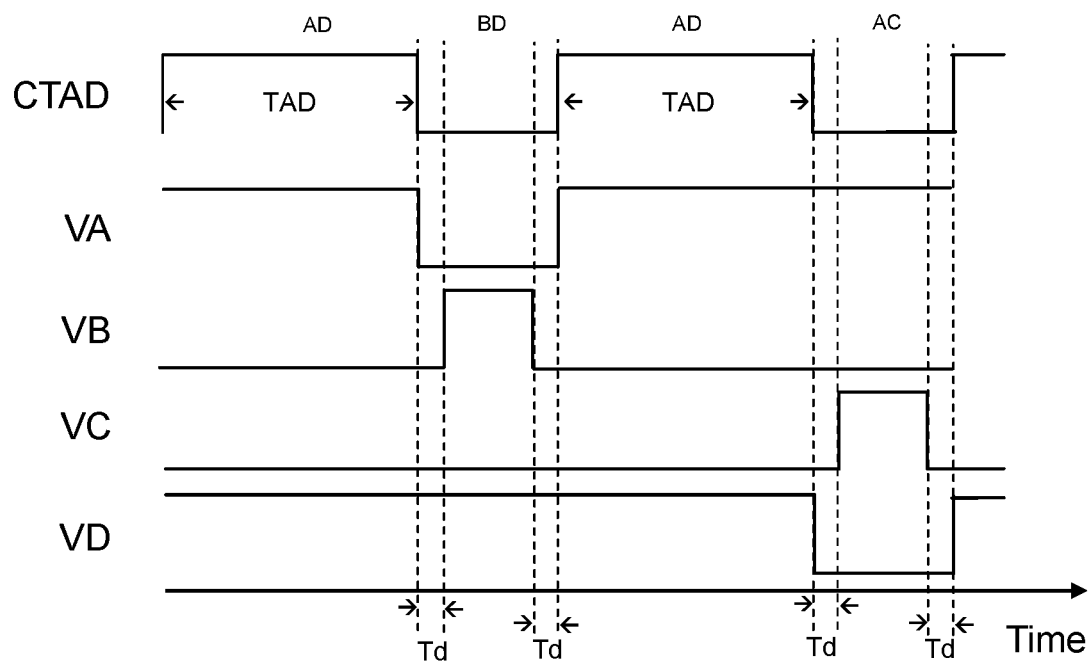

FIG. 8C show an example of signal waveforms corresponding to the constant time buck-boost switching regulator (105 or 110-112) according to the present invention. In this embodiment, between the first state and the second state, and/or between the first state and the third state, there is a fourth state which is a dead time Td between two states, wherein the control circuit 20' controls the power switch circuit 10 such that the first end or the second end of the inductor L is floating. For example, as shown in FIG. 8C, between the first state (AD) and the second state (BD), there is a fourth state Td, and in buck power conversion mode, the fourth state is: switch D ON and switches A, B and C OFF, that is, the first end of the inductor L is floating. On the other hand, between the first state (AD) and the third state (AC), there is a fourth state Td, and in boost power conversion mode, the fourth state is: switch A ON and switches B, C and D OFF, that is, the second end of the inductor L is floating.

The present invention further has an advantage that: because the present invention is not operated according to a clock signal having a constant frequency, the constant time buck-boost switching regulator according to the present invention can easily combines a discontinuous conduction mode (i.e., the constant time buck-boost switching regulator according to the present invention can easily operate in a discontinuous conduction mode), wherein when the inductor current is lower than a current threshold, the constant time buck-boost switching regulator can enter the aforementioned fourth state to increase the power conversion efficiency in light load condition.

"Note that the term "constant time" means that when the switching regulator is operating in a stable state and the external conditions maintain the same, the "constant time" has a constant duration. However, this does not mean that when the external conditions change, the "constant time" still has to be the same. Under different application conditions, the "constant time" can be adaptively programmed or set. For example, in applications which prefer the operation frequencies to be stable, the duration of the "constant time" can be adaptively programmed according to different input voltages and output voltages. For another example, in applications which prefer better line voltage transient response or load transient response, the duration of the "constant time" can be adaptively programmed according to different output voltages and output currents. In other words, the "constant time" can be different if the external conditions are different, and the term "constant time" means that its duration is substantially a constant when the external conditions are the same, but does not mean that the duration of the "constant time" is necessarily the same when the external conditions are different."

The present invention has been described in considerable detail with reference to certain preferred embodiments thereof. It should be understood that the description is for illustrative purpose, not for limiting the scope of the present invention. It is not limited for each of the embodiments described hereinbefore to be used alone; under the spirit of the present invention, two or more of the embodiments described hereinbefore can be used in combination. That is, two or more of the embodiments can be used together, or, a part of one embodiment can be used to replace a corresponding part of another embodiment. As an example, the input switch unit 11 including an input upper switch A and an input lower diode B' in FIG. 6B can be combined with the output switch unit 12 including an output lower switch C and an output upper switch D, to form another embodiment of the power switch circuit 10.

In addition, under the spirit of the present invention, those skilled in this art can readily conceive variations and modifications within the spirit of the present invention. For example, in a constant time switching regulator, there are many variations with respect to the source signal based on which for modulation and the way of modulation. In the embodiments shown in FIGS. 9-12, the comparison circuit 21 compares the ramp signal VRMP which is related to the inductor current IL with the feedback related signal VOR which is generated through an error amplifier circuit 24', to generate a comparison output signal COMP to determine the timing to trigger the constant time and the corresponding duty ratio; however, this is only a non-limiting example and the present invention is not limited to such a structure. For another example, the output voltage VOUT or its divided voltage is directly compared with a reference voltage to determine the timing to trigger the constant time and the corresponding duty ratio. Although the latter example does not directly compare a ramp signal with a feedback related signal, however, because the output voltage is often stored in an output capacitor which has a parasitic resistance, the output voltage in fact contains information of the inductor current, and thus this example also, in substance, contains components of a signal related to the inductor current and a signal related to the output voltage; therefore, such a structure can also apply the present invention to switch the power switch circuit among the first, second and third (and fourth) states. In short, the present invention can be applied to many different switching regulator structures.

In addition, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. And, a comparison circuit can be embodied as a comparator circuit or an operational amplifier circuit, as required.

The spirit of the present invention should cover all the above and other modifications and variations, which should be interpreted to fall within the scope of the following claims and their equivalents.

What is claimed is:

1. A constant time buck-boost switching regulator, comprising:
    a power switch circuit, including an input switch unit and an output switch unit; the input switch unit being configured to operably switch a first end of an inductor between an input voltage and a ground, and the output switch unit being configured to operably switch a second end of the inductor between an output voltage and the ground; and
    a control circuit including a constant time generation circuit for generated a constant time, when a ramp signal intersects a feedback related signal, the control circuit being configured to operably control the power switch circuit to enter a first state and maintain in the first state for the constant time, and after the constant time ends, when the ramp signal exceeds the feedback related signal, the control circuit being configured to operably control the power switch circuit to enter a second state, while when the ramp signal does not exceed the feedback related signal, the control circuit being configured to control the power switch circuit to enter a third state, wherein the feedback related signal is related to the output voltage;
    wherein, in the first state, the power switch circuit electrically connects the first end of the inductor to the input voltage and electrically connects the second end of the inductor to the output voltage; in the second state, the power switch circuit electrically connects the first end of the inductor to the ground and electrically connects the second end of the inductor to the output voltage; and in the third state, the power switch circuit electrically connects the first end of the inductor to the input voltage and electrically connects the second end of the inductor to the ground.

2. The constant time buck-boost switching regulator according to claim 1, wherein the ramp signal is related to a current of the inductor (inductor current), or simulates the inductor current.

3. The constant time buck-boost switching regulator according to claim 2, wherein the ramp signal is proportional to the inductor current.

4. The constant time buck-boost switching regulator according to claim 3, wherein the feedback related signal corresponds to a stable state value.

5. The constant time buck-boost switching regulator according to claim 2, wherein the ramp signal does not include a direct current component of the inductor current.

6. The constant time buck-boost switching regulator according to claim 1, wherein the control circuit includes:
    a comparison circuit, configured to operably compare the ramp signal with the feedback related signal to generate a comparison output signal;
    the constant time generation circuit, configured to operably trigger the constant time according to the comparison output signal when the ramp signal intersects the feedback related signal; and
    a logic driver circuit, coupled to the comparison circuit and the constant time generation circuit, and configured to operably control the power switch circuit to enter the first state and maintain in the first state for the constant time, and control the power switch circuit to enter the second or third state when the constant time ends according to a level of the comparison output signal.

7. The constant time buck-boost switching regulator according to claim 6, wherein the control circuit further includes an error amplifier circuit, configured to operably generate the feedback related signal according to a difference between a signal related to the output voltage and a reference voltage.

8. The constant time buck-boost switching regulator according to claim 6, wherein the control circuit further includes a ramp generation circuit, configured to operably generate the ramp signal by one or more of the following ways: (1) the ramp generation circuit senses a current of the inductor (inductor current), and generates the ramp signal according to the inductor current; or (2) the ramp generation circuit simulates the inductor current according to the input voltage and the output voltage to generate the ramp signal.

9. The constant time buck-boost switching regulator according to claim 1, wherein between the first state and the second state, or between the first state and the third state, there is a fourth state which is a dead time, wherein in the fourth state, the control circuit controls the power switch circuit such that the first end or the second end of the inductor is floating.

10. The constant time buck-boost switching regulator according to claim 1, wherein the input switch unit includes:
    an input upper switch, coupled between the input voltage and the first end of the inductor; and
    an input lower switch or an input lower diode, coupled between the ground and the first end of the inductor;
    wherein the control circuit controls the input upper switch, or the input upper switch and the input lower switch, to switch the first end of the inductor between the input voltage and the ground.

11. The constant time buck-boost switching regulator according to claim 1, wherein the output switch unit includes:

an output lower switch, coupled between the ground and the second end of the inductor; and an output upper switch or an output upper diode, coupled between the output voltage and the second end of the inductor;

wherein the control circuit controls the output lower switch, or the output upper switch and the output lower switch, to switch the second end of the inductor between the output voltage and the ground.

12. A control circuit for controlling a constant time buck-boost switching regulator, the constant time buck-boost switching regulator including a power switch circuit which includes an input switch unit and an output switch unit; the input switch unit being configured to operably switch a first end of an inductor between an input voltage and a ground, and the output switch unit being configured to operably switch a second end of the inductor between an output voltage and the ground, wherein an inductor current flows through the inductor; when a ramp signal intersects a feedback related signal, the control circuit being configured to operably control the power switch circuit to enter a first state and maintain in the first state for a constant time, and after the constant time ends, when the ramp signal exceeds the feedback related signal, the control circuit being configured to operably control the power switch circuit to enter a second state, while when the ramp signal does not exceed the feedback related signal, the control circuit being configured to control the power switch circuit to enter a third state, wherein, in the first state, the power switch circuit electrically connects the first end of the inductor to the input voltage and electrically connects the second end of the inductor to the output voltage; in the second state, the power switch circuit electrically connects the first end of the inductor to the ground and electrically connects the second end of the inductor to the output voltage; and in the third state, the power switch circuit electrically connects the first end of the inductor to the input voltage and electrically connects the second end of the inductor to the ground, and wherein the feedback related signal is related to the output voltage; the control circuit comprising:

a comparison circuit, configured to operably compare the ramp signal with the feedback related signal to generate a comparison output signal;

a constant time generation circuit, configured to operably trigger the constant time according to the comparison output signal when the ramp signal intersects the feedback related signal; and a logic driver circuit, coupled to the comparison circuit and the constant time generation circuit, and configured to operably control the power switch circuit to enter the first state and maintain in the first state for the constant time, and control the power switch circuit to enter the second or third state when the constant time ends according to a level of the comparison output signal.

13. The control circuit according to claim 12, wherein the ramp signal is related to the inductor current, or simulates the inductor current.

14. The control circuit according to claim 13, wherein the ramp signal is proportional to the inductor current.

15. The control circuit according to claim 14, wherein the feedback related signal corresponds to a stable state value.

16. The control circuit according to claim 13, wherein the ramp signal does not include a direct current component of the inductor current.

17. The control circuit according to claim 12, wherein the control circuit further includes an error amplifier circuit, configured to operably generate the feedback related signal according to a difference between a signal related to the output voltage and a reference voltage.

18. The control circuit according to claim 12, wherein the control circuit further includes a ramp generation circuit, configured to operably generate the ramp signal by one or more of the following ways: (1) the ramp generation circuit senses a current of the inductor (inductor current), and generates the ramp signal according to the inductor current; or (2) the ramp generation circuit simulates the inductor current according to the input voltage and the output voltage to generate the ramp signal.

19. The control circuit according to claim 12, wherein between the first state and the second state, or between the first state and the third state, there is a fourth state which is a dead time, wherein in the fourth state, the control circuit controls the power switch circuit such that the first end or the second end of the inductor is floating.

20. A control method for controlling a constant time buck-boost switching regulator, the constant time buck-boost switching regulator including a power switch circuit which includes an input switch unit and an output switch unit; the input switch unit being configured to operably switch a first end of an inductor between an input voltage and a ground, and the output switch unit being configured to operably switch a second end of the inductor between an output voltage and the ground, wherein an inductor current flows through the inductor; the control method comprising:

when a ramp signal intersects a feedback related signal, controlling the power switch circuit to enter a first state and maintain in the first state for a constant time, wherein the feedback related signal is related to the output voltage, and wherein the constant time is generated by a constant time generation circuit;

when the constant time ends, judging whether the ramp signal exceeds the feedback related signal; and when the ramp signal exceeds the feedback related signal, controlling the power switch circuit to enter a second state, or when the ramp signal does not exceed the feedback related signal, controlling the power switch circuit to enter a third state;

wherein, in the first state, the power switch circuit electrically connects the first end of the inductor to the input voltage and electrically connects the second end of the inductor to the output voltage; in the second state, the power switch circuit electrically connects the first end of the inductor to the ground and electrically connects the second end of the inductor to the output voltage; and in the third state, the power switch circuit electrically connects the first end of the inductor to the input voltage and electrically connects the second end of the inductor to the ground.

21. The control method according to claim 20, wherein the ramp signal is related to the inductor current, or simulates the inductor current.

22. The control method according to claim 21, wherein the feedback related signal corresponds to a stable state value.

* * * * *